US010516598B2

(12) United States Patent
Manthiramoorthy et al.

(10) Patent No.: US 10,516,598 B2
(45) Date of Patent: Dec. 24, 2019

(54) DETECTING AND PREVENTING NETWORK LOOPS

(71) Applicant: Cisco Technology, Inc., San Jose, CA (US)

(72) Inventors: Natarajan Manthiramoorthy, San Jose, CA (US); Venkatesh Srinivasan, San Jose, CA (US); Swaminathan Narayanan, San Jose, CA (US); Ambrish Niranjan Mehta, San Jose, CA (US); Anand Kumar Singh, San Jose, CA (US); Anulekha Chodey, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 174 days.

(21) Appl. No.: 15/232,591

(22) Filed: Aug. 9, 2016

(65) Prior Publication Data

US 2018/0026810 A1    Jan. 25, 2018

Related U.S. Application Data

(63) Continuation of application No. 15/216,666, filed on Jul. 21, 2016.

(51) Int. Cl.
*H04L 12/751* (2013.01)
*H04L 29/06* (2006.01)
(Continued)

(52) U.S. Cl.
CPC ............ *H04L 45/18* (2013.01); *H04L 5/0012* (2013.01); *H04L 12/437* (2013.01);
(Continued)

(58) Field of Classification Search
CPC .......... H04L 45/18; H04L 45/28; H04L 45/32
See application file for complete search history.

(56) References Cited

U.S. PATENT DOCUMENTS 6,765,881 B1    7/2004    Rajakarunanayake
6,879,588 B1    4/2005    Malalur
(Continued)

FOREIGN PATENT DOCUMENTS

WO    WO 2007/049826    5/2007

OTHER PUBLICATIONS

International Search Report and Written Opinion from the International Searching Authority for the corresponding International Application PCT/US2017/040819, dated Nov. 9, 2017, 12 pages.

*Primary Examiner* — Brian S Roberts
*Assistant Examiner* — Abusayeed M Haque
(74) *Attorney, Agent, or Firm* — Polsinelli PC

(57) ABSTRACT

Systems, methods, and non-transitory computer-readable storage media for detecting network loops. In some embodiments, a system can identify a network path having multiple hops associated with respective nodes which are configured in a forwarding mode. The system can traverse the network path to identify, for each node from the respective nodes, a respective next hop. Based on the respective next hop for each node, the system can determine whether two or more nodes from the respective nodes have a same respective next hop. When the two or more nodes have the same respective next hop, the system can determine that the network path has a network loop.

20 Claims, 15 Drawing Sheets

(51) Int. Cl.
  *H04L 12/24* (2006.01)
  *H04L 12/705* (2013.01)
  *H04L 12/26* (2006.01)
  *H04L 12/931* (2013.01)
  *H04L 29/08* (2006.01)
  *H04L 5/00* (2006.01)
  *H04L 12/437* (2006.01)
  *H04L 12/46* (2006.01)
  *H04L 12/721* (2013.01)
  *H04L 12/753* (2013.01)
  *H04L 29/12* (2006.01)
  *H04L 12/703* (2013.01)

(52) U.S. Cl.
  CPC .......... *H04L 12/4641* (2013.01); *H04L 43/08* (2013.01); *H04L 45/28* (2013.01); *H04L 45/32* (2013.01); *H04L 45/48* (2013.01); *H04L 49/354* (2013.01); *H04L 61/6022* (2013.01); *H04L 69/324* (2013.01); *Y02D 30/30* (2018.01)

(56) References Cited

U.S. PATENT DOCUMENTS

| | | |
|---|---|---|
| 7,111,163 B1 | 9/2006 | Haney |
| 9,553,845 B1 | 1/2017 | Talmor et al. |
| 9,819,551 B2 | 11/2017 | Forster et al. |
| 10,079,752 B2 | 9/2018 | Manthiramoorthy et al. |
| 10,110,469 B2 | 10/2018 | Manthiramoorthy et al. |
| 2003/0169859 A1 | 9/2003 | Strathmeyer et al. |
| 2003/0193912 A1 | 10/2003 | O'Neill |
| 2006/0039371 A1* | 2/2006 | Castro ................. H04L 12/42 370/389 |
| 2008/0112491 A1* | 5/2008 | Shaanan ............. H03M 13/03 375/253 |
| 2008/0115203 A1 | 5/2008 | Elzur |
| 2008/0310433 A1* | 12/2008 | Retana ................. H04L 45/02 370/401 |
| 2010/0046524 A1 | 2/2010 | Rune et al. |
| 2010/0198970 A1 | 8/2010 | Ingle et al. |
| 2010/0198979 A1 | 8/2010 | Pickens et al. |
| 2011/0122878 A1* | 5/2011 | Li ...................... H04L 45/026 370/400 |
| 2013/0049786 A1* | 2/2013 | El-Hassan .......... H04B 17/0085 324/756.01 |
| 2013/0108263 A1 | 5/2013 | Srinivas et al. |
| 2014/0056125 A1 | 2/2014 | Guellal et al. |
| 2014/0198793 A1 | 7/2014 | Allu et al. |
| 2014/0198801 A1 | 7/2014 | Venkatesh |
| 2014/0325634 A1 | 10/2014 | Iekel-Johnson et al. |
| 2015/0036544 A1* | 2/2015 | Singh .................. H04L 41/12 370/255 |
| 2015/0063108 A1 | 3/2015 | Bhagavathiperumal et al. |
| 2015/0089048 A1 | 3/2015 | Jackson et al. |
| 2015/0126132 A1* | 5/2015 | Chung ................ H04B 1/3827 455/67.14 |
| 2015/0281178 A1 | 10/2015 | Raman et al. |
| 2015/0304126 A1* | 10/2015 | Vallala ................. H04L 12/44 370/256 |
| 2016/0019318 A1* | 1/2016 | Tanaka ................. G06Q 10/06 703/1 |
| 2016/0173338 A1 | 6/2016 | Wolting |
| 2016/0301565 A1* | 10/2016 | Zahid ................. H04L 41/0672 |
| 2017/0093713 A1* | 3/2017 | Garcia-Luna-Aceves ................. H04L 45/50 |
| 2017/0195222 A1 | 7/2017 | Schrum, Jr. |

\* cited by examiner

| SEED NODE | NODE DATABASE | PHYSICAL LINK | NEXT HOP |
|---|---|---|---|
| A | ['A'] | A, L1 | B |
| B | ['A','B'] | B, L2 | C |
| C | ['A','B','C'] | C, L4 | D |
| D | ['A','B','C'] | C, L3 | B*** |

*** - Loop

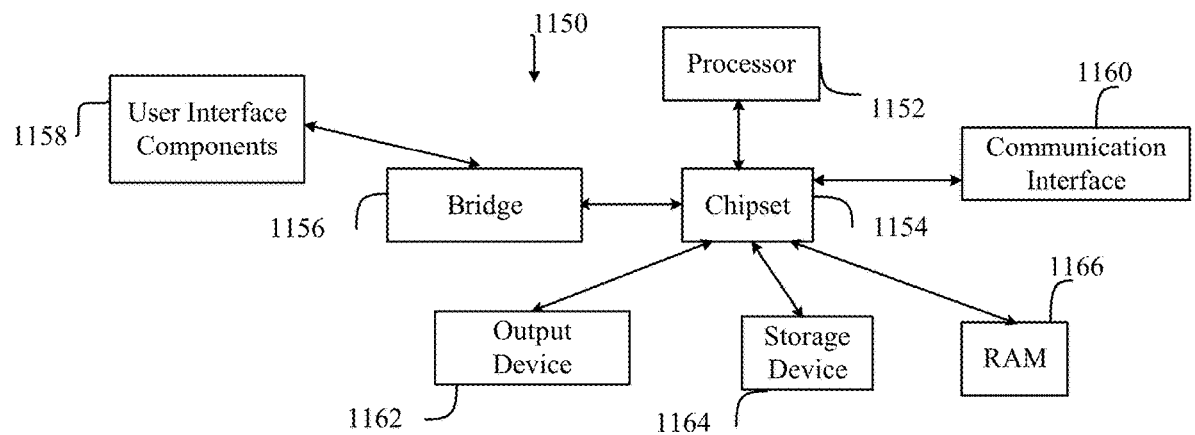
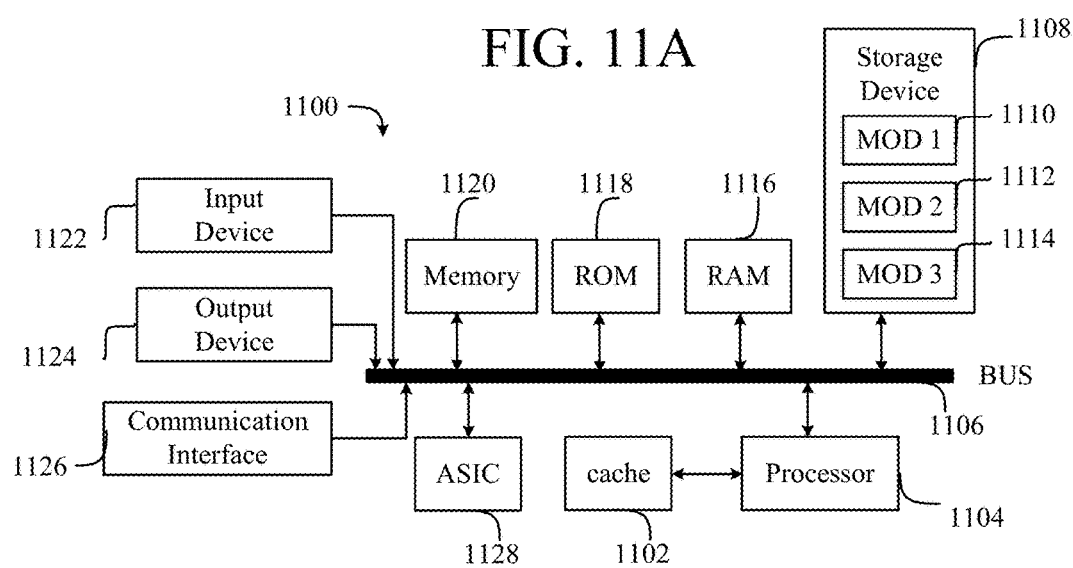

DETECTING AND PREVENTING NETWORK LOOPS

RELATED APPLICATIONS

This application is a continuation application of U.S. Non-Provisional patent application Ser. No. 15/216,666, entitled "DETECTING AND PREVENTING NETWORK LOOPS", filed on Jul. 21, 2016; entitled "DETECTING AND PREVENTING NETWORK LOOPS", filed herewith; the contents of which are incorporated herein by reference in their entirety.

TECHNICAL FIELD

The present technology pertains to network loops, and more specifically pertains to mechanisms for detecting and preventing network loops.

BACKGROUND

The soaring demand for network data has steadily fueled the evolution of networking technologies, as engineers and manufacturers rush to keep pace with the changing data consumption landscape and increasing network scalability requirements. Various network technologies have been developed precisely to meet this soaring demand for network data. For example, overlay network solutions, such as virtual extensible local area networks (VXLANs), as well as virtualization and cloud computing technologies, have been widely implemented in networks with increasing success as popular solutions to such growing demands for network data.

However, while the advancement in network technologies has allowed networks to support increased demand for network data, it has also resulted in larger and more complex networks, involving massive amounts of traffic data constantly being routed through the network. And as the amount of traffic handled by the network grows, it becomes increasingly important to ensure efficient and error-free routing and switching strategies. Precisely, poor routing and switching strategies can create an enormous burden on the network, which only worsens as the amount of traffic grows, and can result in inefficient and costly traffic routing and switching, as well as routing and switching errors, such as route flaps and network loops. Not surprisingly, proper cabling and switching configurations are also important for handling large amounts of traffic, as they can help increase network efficiency and loops. Unfortunately, as the complexity of the network grows, it becomes increasingly difficult to manage the various cabling, switch, and router configurations in the network, and detect the precise point of failure in a network.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIGS. 11A and 11B illustrate schematic diagrams of example system architectures.

DESCRIPTION OF EXAMPLE EMBODIMENTS

Figure 1A:
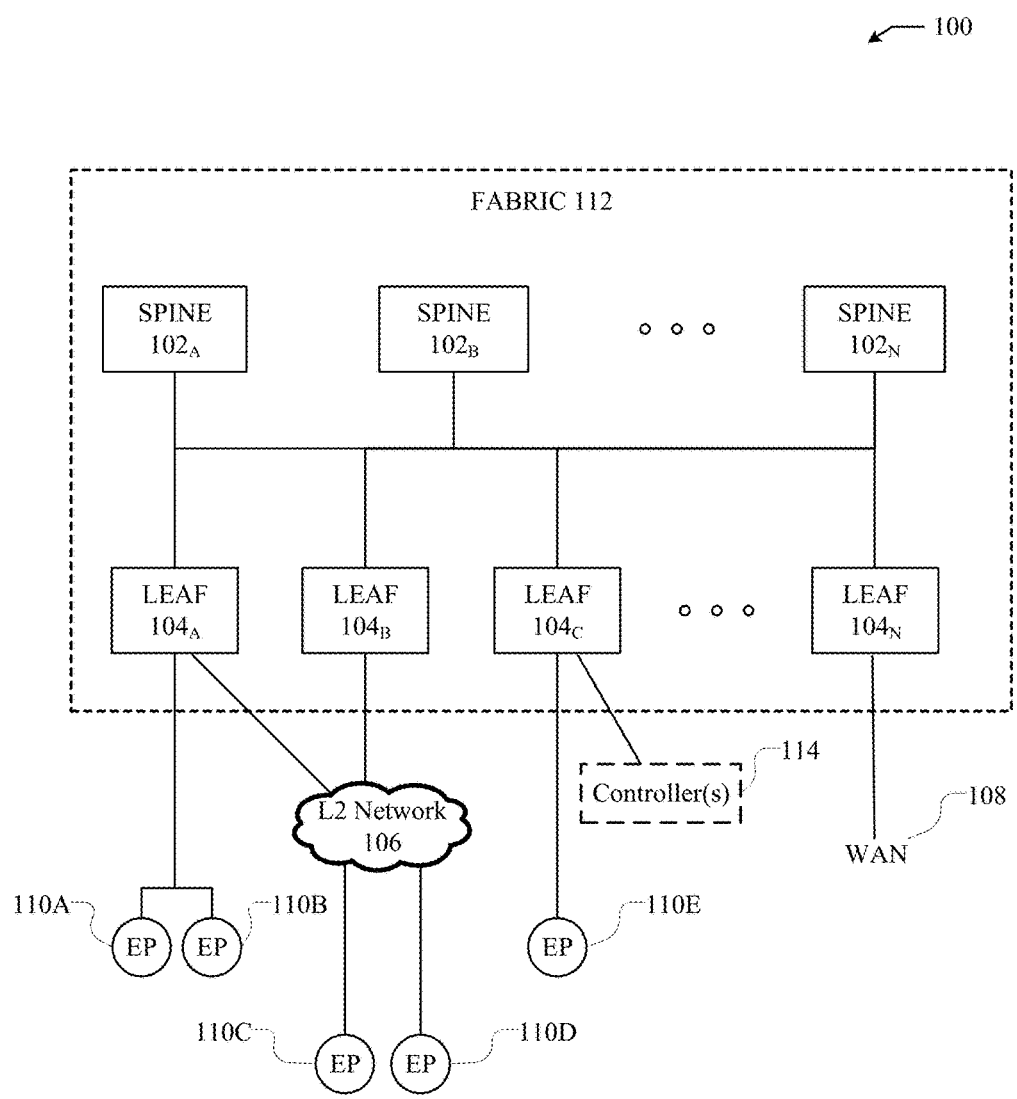
FIG. 1A illustrates a schematic block diagram of an example network architecture.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

As previously mentioned, improper cabling, switch, and router configurations can have harmful and even devastating effects on a network. For example, improper cabling or port configurations in a network can result in a forwarding loop being formed in the network. A loop in the network can severely undermine and often cripple the network. In some cases, depending on the external connection, a loop can even create a fatal meltdown in the network. Moreover, a network can be particularly susceptible to a fatal meltdown when broadcast or multicast messages are transmitted through links that are connected into a loop. Yet as new, larger networks and more complex configurations are implemented in a network environment, error detection and correction, such as loop detection and correction, become a significant challenge for network engineers.

Unfortunately, however, current solutions fail to provide adequate prevention against improper cabling, routing configurations, and software bugs, particularly on larger, more complex environments, and lack effective mechanisms for intelligently and dynamically detecting such improper configurations and conditions. Thus, it would be advantageous to implement a mechanism that allows for intelligent and efficient detection and correction of network loops in a network.

The approaches set forth herein can be implemented to address the foregoing issues, for example, by detecting a loop in a network and performing a corrective action, such as blocking or re-configuring one or more links in the loop. The approaches herein provide various ways for detecting loops in a network based on miscabling, misconfiguration, software bugs, etc.

Disclosed are systems, methods, and non-transitory computer-readable storage media for detecting network loops in a network. As follows, a method of the subject technology is described with respect to a system performing steps for loop detection. Here, the system can refer to a device, such as a network device, including a switch, as described further below.

The system can identify a port that is in a blocking state, which enables dropping of specific types of packets and preventing the port from forwarding the specific types of packets, and determine whether the port is nevertheless failing to drop and/or forwarding packets into a loop. For example, the system can determine a first number of packets transmitted through the port by a hardware layer on the system, such as an ASIC (application specific integrated circuit) on the system. The system can also determine a second number of control packets transmitted through the port by a software layer on the system.

The system can determine whether the first number of packets is greater than the second number of control packets, and when the first number of packets is greater than the second number of control packets, determine that the blocking state has failed to prevent the port from forwarding the one or more types of packets.

DESCRIPTION

The disclosed technology addresses the need in the art for accurate and efficient detection of network loops in a network. Disclosed are systems, methods, and computer-readable storage media for detecting network loops. A brief introductory description of exemplary systems and networks, as illustrated in FIGS. 1 through 4, is disclosed herein. A detailed description of network loops and mechanisms for detecting and preventing network loops will then follow. These variations shall be described herein as the various embodiments are set forth. The disclosure now turns to FIG. 1.

FIG. 1A illustrates a schematic block diagram of an example network architecture 100. The architecture 100 includes a network fabric 112 with spine switches 102A, 102B, . . . , 102N (collectively "102") connected to leaf switches 104A, 104B, 104C, . . . , 104N (collectively "104") in the network fabric 112.

Spine switches 102 can be Layer 3 ("L3") switches in the fabric 112. However, in some cases, the spine switches 102 can also, or otherwise, perform Layer 2 ("L2") functionalities. Spine switches 102 connect to leaf switches 104 in the fabric 112. Leaf switches 104 can include access ports (or non-fabric ports) and fabric ports. Fabric ports can provide uplinks to the spine switches 102, while access ports can provide connectivity for devices, hosts, endpoints, VMs, or external networks to the fabric 112.

Leaf switches 104 can reside at the boundary between the fabric 112 and the tenant or customer space. In some cases, the leaf switches 104 can be top-of-rack ("ToR") switches, aggregation switches, end-of-row (EoR), middle-of-row (MoR) switches, etc.

The leaf switches 104 can be responsible for routing and/or bridging the tenant packets and applying network policies. In some cases, a leaf switch can perform one or more additional functions, such as implementing a mapping cache, sending packets to the proxy function when there is a miss in the cache, encapsulate packets, enforce ingress or egress policies, etc.

Moreover, the leaf switches 104 can contain virtual switching and/or tunneling functionalities, such as a virtual tunnel endpoint (VTEP) function as explained below in FIG. 1B. Thus, leaf switches 104 can connect the fabric 112 to an overlay (e.g., network 150 and/or software-defined network.

Network connectivity in the fabric 112 can flow through the leaf switches 104. The leaf switches 104 can provide servers, resources, endpoints, external networks, or VMs access to the fabric 112, and can connect the leaf switches 104 to each other. In some cases, the leaf switches 104 can connect endpoint groups ("EPGs") to the fabric 112 and/or any external networks. Each EPG can connect to the fabric 112 via one or more of the leaf switches 104, for example.

Endpoints 110A-E (collectively "110") can connect to the fabric 112 via leaf switches 104. For example, endpoints 110A and 110B can connect directly to leaf switch 104A, which can connect endpoints 110A and 110B to the fabric 112 and/or any other of the leaf switches 104. Similarly, endpoint 110E can connect directly to leaf switch 104C, which can connect endpoint 110E to the fabric 112 and/or any other of the leaf switches 104. On the other hand, endpoints 110C and 110D can connect to leaf switch 104B via L2 network 106. Moreover, the wide area network (WAN) 108 can connect to the leaf switches 104N.

Endpoints 110 can include any communication device, such as a computer, a server, a switch, etc. In some cases, the endpoints 110 can include a server or switch configured with a virtual tunnel endpoint functionality which connects an overlay network, such as overlay network 150 below, with the fabric 112. For example, in some cases, the endpoints 110 can represent hosts (e.g., servers) with virtual tunnel endpoint capabilities, and running virtual environments (e.g., hypervisor, virtual machine(s), containers, etc.). An overlay network associated with the endpoints 110 can host physical devices, such as servers; applications; EPGs; virtual segments; virtual workloads; etc. Likewise, endpoints 110 can also host virtual workloads and applications, which can connect with the fabric 112 or any other device or network, including an external network.

Figure 1B:
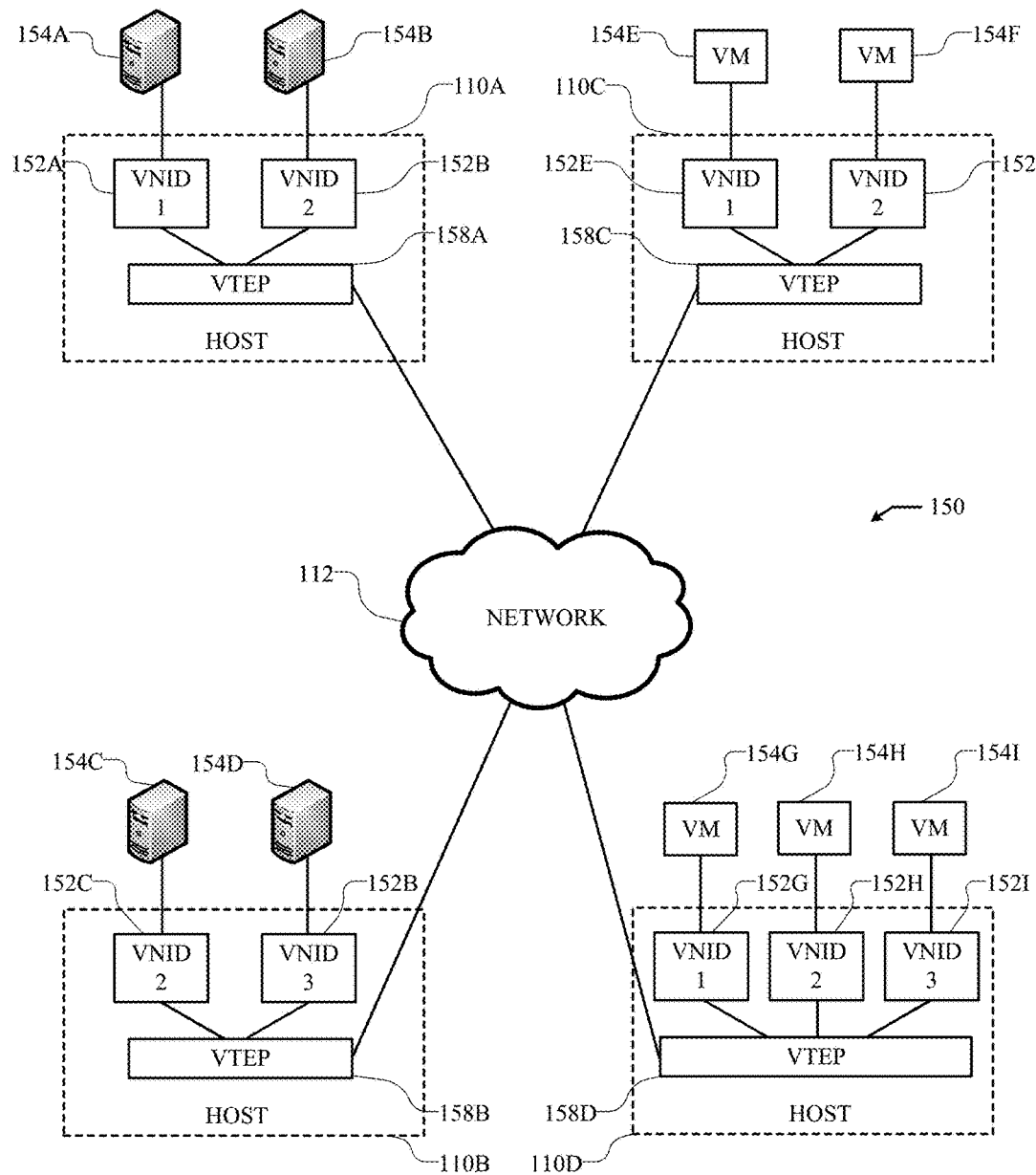
FIG. 1B illustrates an example overlay network.

FIG. 1B illustrates an example overlay network 150. Overlay network 150 can use an overlay protocol, such as VXLAN, VGRE, VO3, or STT, to encapsulate traffic in L2 and/or L3 packets which can cross overlay L3 boundaries in the network. As illustrated in FIG. 1B, overlay network 150 can include hosts 110A-D interconnected via network fabric 112.

The hosts 110A-D can be configured as virtual tunnel end points (VTEP) 158A-D, which can be virtual nodes or switches configured to encapsulate and de-encapsulate data traffic according to a specific overlay protocol of the network 150, for the various virtual network identifiers (VNIDs) 152A-I of the overlay 150. In some embodiments, network 150 can be a VXLAN network, and VTEPs 158A-D can be VXLAN tunnel endpoints.

The VNIDs can represent the segregated virtual networks in overlay network 150. Each of the overlay tunnels (VTEPs 158A-D) can include one or more VNIDs. For example, VTEP 158A can include VNIDs 1 and 2, VTEP 158B can include VNIDs 2 and 3, VTEP 158C can include VNIDs 1 and 2, and VTEP 158D can include VNIDs 1-3. As one of ordinary skill in the art will readily recognize, any particular VTEP can, in other embodiments, have numerous VNIDs, including more than the 3 VNIDs illustrated in FIG. 1B.

The traffic in overlay network 150 can be segregated logically according to specific VNIDs. This way, traffic intended for VNID 1 can be accessed by devices residing in VNID 1, while other devices residing in other VNIDs (e.g., VNIDs 2 and 3) can be prevented from accessing such traffic. In other words, devices or endpoints connected to specific VNIDs can communicate with other devices or endpoints connected to the same specific VNIDs, while traffic from separate VNIDs can be isolated to prevent devices or endpoints in other specific VNIDs from accessing traffic in different VNIDs.

Endpoints and VMs 154A-I can connect to their respective VNID or virtual segment, and communicate with other endpoints or VMs residing in the same VNID or virtual segment. For example, endpoint 154A can communicate with endpoint 154C and VMs 154E, 154G because they all reside in the same VNID, namely, VNID 1. Similarly, endpoint 154B can communicate with VMs 154F, 154H because they all reside in VNID 2.

VTEPs 158A-D can encapsulate packets directed at the various VNIDs 1-3 in the overlay network 150 according to the specific overlay protocol implemented, such as VXLAN, so traffic can be properly transmitted to the correct VNID and recipient(s). Moreover, when a switch, router, or other network device receives a packet to be transmitted to a recipient in the overlay network 150, it can analyze a routing table, such as a lookup table, to determine where such packet needs to be transmitted so the traffic reaches the appropriate recipient. For example, if VTEP 158A receives a packet from endpoint 154B that is intended for endpoint 154H, VTEP 158A can analyze a routing table that maps the intended endpoint, endpoint 154H, to a specific switch that is configured to handle communications intended for endpoint 154H. VTEP 158A might not initially know, when it receives the packet from endpoint 154B, that such packet should be transmitted to VTEP 158D in order to reach endpoint 154H. Accordingly, by analyzing the routing table, VTEP 158A can lookup endpoint 154H, which is the intended recipient, and determine that the packet should be transmitted to VTEP 158D, as specified in the routing table based on endpoint-to-switch mappings or bindings, so the packet can be transmitted to, and received by, endpoint 154H as expected.

However, continuing with the previous example, in many instances, VTEP 158A may analyze the routing table and fail to find any bindings or mappings associated with the intended recipient, e.g., endpoint 154H. Here, the routing table may not yet have learned routing information regarding endpoint 154H. In this scenario, the VTEP 158A may likely broadcast or multicast the packet to ensure the proper switch associated with endpoint 154H can receive the packet and further route it to endpoint 154H.

In some cases, the routing table can be dynamically and continuously modified by removing unnecessary or stale entries and adding new or necessary entries, in order to maintain the routing table up-to-date, accurate, and efficient, while reducing or limiting the size of the table.

As one of ordinary skill in the art will readily recognize, the examples and technologies provided above are simply for clarity and explanation purposes, and can include many additional concepts and variations.

Figure 2:
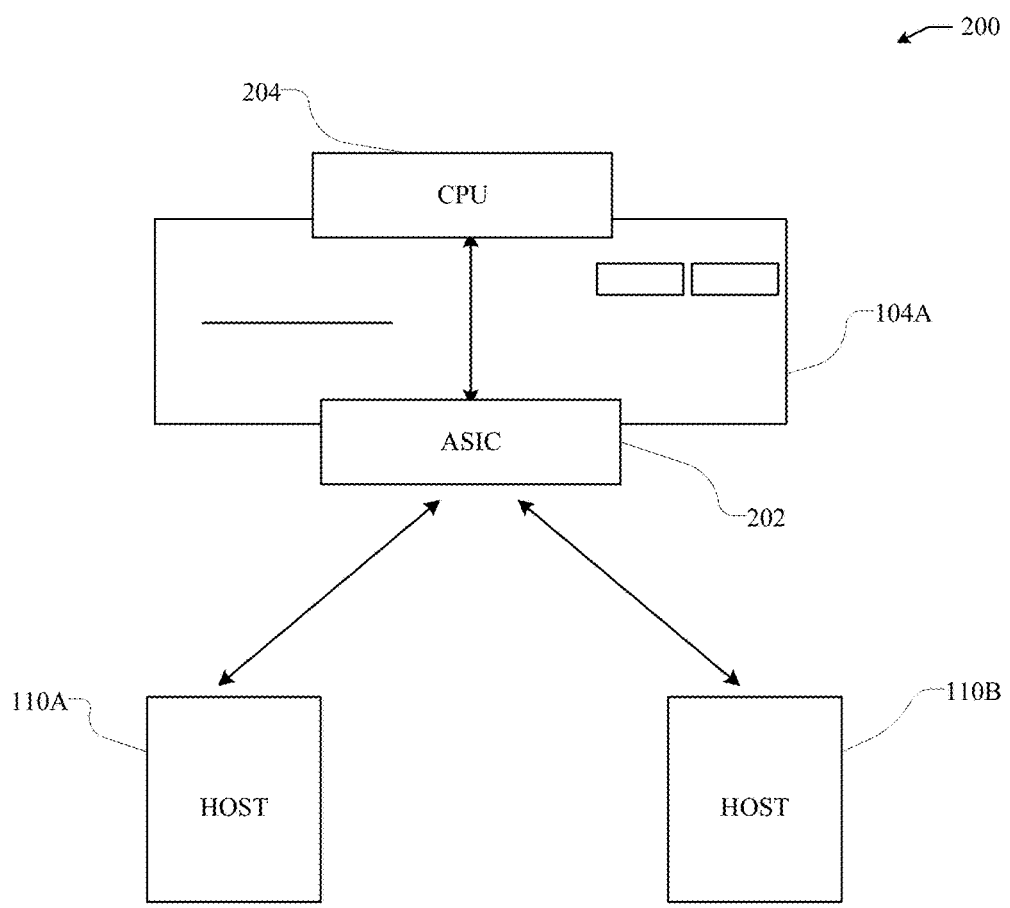
FIG. 2 illustrates a schematic diagram of an example configuration of a network device.

FIG. 2 illustrates a schematic diagram of an example configuration 200 of a network device 104A. The network device 104 can have one or more ASICs (application specific integrated circuits) for performing forwarding and routing operations as well as a CPU PROCESS 204 for performing forwarding and routing operations. The ASIC 202 can be specific to a port, a line card, or a group of ports. For example, in some examples, the network device 104A can have an ASIC for every port and/or every line card. An ASIC for a port or line card can perform the forwarding or routing operations for that specific port or line card.

The ASIC 202 can perform hardware routing, such as forwarding, transmitting, receiving, etc. The network device 104A can also include a CPU PROCESS 204 for routing operations, such as forwarding, transmitting, receiving, etc. The CPU PROCESS 204 can include software for executing the routing operations via the CPU PROCESS 204. The software can include a forwarding or supervisor engine, a routing table, security and policy rules, device and/or address mappings, port configurations and mappings, etc. Moreover, the CPU PROCESS 204 can be driven by one or more processors (not shown) of the network device 104A.

In some cases, the CPU PROCESS 204 can be configured to send and/or receive control plane traffic for the network device 104A, such as bridge protocol data unit (BPDU) packets, link aggregation control protocol (LACP) packets, link layer discovery protocol (LLDP) packets, cisco discovery protocol (CDP) packets, SYN/ACK packets, etc. The CPU PROCESS 204 can also be configured to send and/or receive data plane traffic (e.g., user content). The ASIC 202 can be configured to send and/or receive control plane traffic and/or data plane traffic.

The ASIC 202 and CPU PROCESS 204 can also communicate with each other. For example, in some cases, the ASIC 202 may be configured to communicate with hosts 110A, 110B, but may communicate with CPU PROCESS 204 as well to forward packets to CPU PROCESS 204 or request routing or policy information. The ASIC 202 may also consult the CPU PROCESS 204 for routing information, such as prefix lookups.

In some cases, control plane traffic processed by the network device 104A must transit through ASIC 202 before reaching the CPU PROCESS 204. For example, control plane traffic may be designated to be handled by the CPU PROCESS 204, but may be processed by the ASIC 202 before reaching the CPU PROCESS 204. Forwarding of other traffic, such as data plane traffic, can be performed by the ASIC 202. However, in some cases, the ASIC 202 may consult with the CPU PROCESS 204 for forwarding decisions.

The CPU PROCESS 204 can be configured to handle all control plane traffic (e.g., BPDU class traffic) for the network device 104A. However, the control plane traffic handled by the CPU PROCESS 204 can also be processed by the ASIC 202, which may also process all control plane traffic to and/or from the CPU PROCESS 204. Thus, if the CPU PROCESS 204 handles 200 control plane packets during a one hour period, the ASIC 202 will also "see" or process those 200 control plane packets.

To manage the routing and/or switching of traffic and prevent network loops, the ASIC 202 and/or CPU PROCESS 204 can be configured to function in a forwarding state or a blocking state. For example, if the ASIC 202 is in a forwarding state, then the ASIC 202 is allowed to forward any traffic processed by the ASIC 202. On the other hand, if the ASIC 202 is set to a blocking state, then the ASIC 202 should then drop any packet it receives, rather than forwarding the packet along its path. In some cases, the ASIC 202 may still receive, transmit, and/or forward certain type of traffic, such as control plane traffic (e.g., BPDU class traffic), while in a blocking state. For example, certain protocols, such as STP (spanning tree protocol), may allow the ASIC 202 to drop all traffic except for certain control plane packets, such as BPDU packets, which are used to manage and/or monitor a network loop and/or other conditions.

The blocking state can be specific to a protocol, such as STP. Moreover, the blocking state can be configured per port and/or per port channel. For example, each port in the network device 104A can be specifically set to a blocking or forwarding state. The blocking and forwarding states can be configured to allow for routing and/or switching of traffic while preventing or limiting loops. Loops can occur for various reasons. For example, a loop can be created as a result of a software bug where the blocking state is not properly programmed in hardware or not properly functioning. For example, if the ASIC 202 is not properly programmed to run in a blocking state, then the ASIC 202 will likely continue to forward packets that should be dropped, which can potentially result in a loop.

In another scenario, a loop can be created due to improper configuration or cabling. For example, ports can be logically and/or physically connected in a loop, thereby resulting in traffic handled by those ports being forwarded in a loop. Moreover, in another scenario, a loop can be created as a result of a disabling or failure of a protocol used in the network to prevent loops. For example, if STP is implemented in a network to prevent loops and STP is disabled, then any port(s) that would otherwise be set by STP to drop packets in a loop, would forward such packets in a loop. All of these network loop scenarios can be detected, prevented, and corrected by the technologies disclosed herein.

The disclosure now turns to various, example loops in a network.

Figure 3:
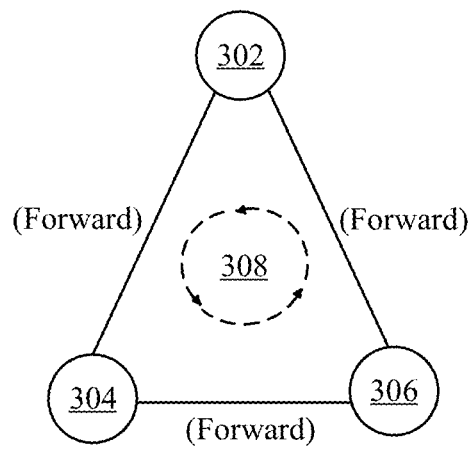
FIG. 3 illustrates a schematic diagram of an example loop.

FIG. 3 illustrates a schematic diagram 300 of an example loop 308. The network loop 308 can flow through ports 302-306. The ports 302-306 can be individual ports in a network device, such as leaf 104A, or port channels, for example. The network loop 308 can be an example network loop. The loop 308 can be the result of a software bug, disabling of STP, and/or a misconfiguration or miscabling of the ports 302-306. The loop 308 may continue until the problem is corrected and/or one of the ports 302-306 is properly set to block traffic.

In particular, the loop 308 is created when a packet is transmitted on one of the ports 302-306 and forwarded throughout the ports 302-306 in a loop. For example, if the ports 302-306 are interconnected and all are set to forwarding mode, the packet will continue to be forwarded throughout the ports 302-306 in a loop 308.

If a broadcast or multicast packet is transmitted by one of the ports 302-306, the traffic generated by the loop 308 can cripple the network and result in a meltdown scenario. Here, the broadcast or multicast packet will exponentially increase the load on the network by creating multiple copies of itself each time the packet loops. Eventually, the load may overburden the network causing a fatal meltdown of the network.

The ports 302-306 can reside on one or more network devices (e.g., switches). The network devices can include physical switches, such as ToRs, and/or virtual switches, such as software switches or a hypervisor running a switching and/or VTEP function. Moreover, the ports can reside on one or more networks, including L2 networks, VLANs, EPGs, overlay networks, L3 networks, etc.

Figure 4:
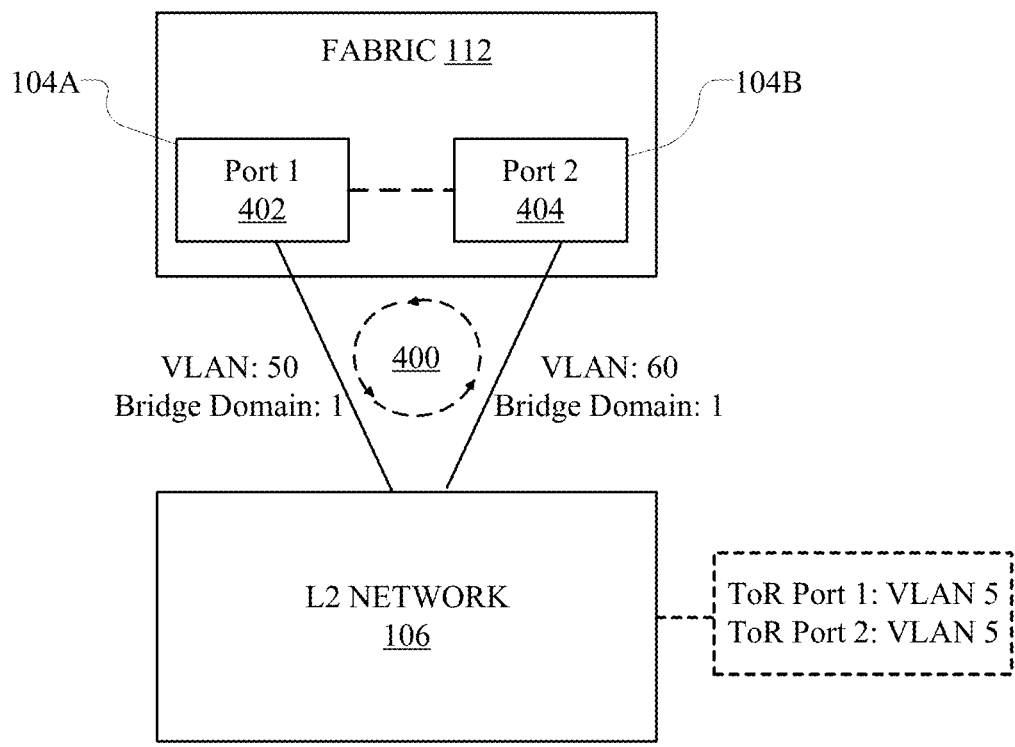
FIG. 4 illustrates an example loop between a fabric and an L2 network.

FIG. 4 illustrates an example loop 400 between a fabric 112 and an L2 network 106. The fabric 112 can include one or more ToR switches hosting ToR ports 1 and 2 (402, 404). ToR ports 1 and 2 (402, 404) can connect the fabric 112 to L2 network 106. Moreover, the ToR ports 1 and 2 (402, 404) can be interconnected through L2 network 106. This interconnection between ToR ports 1 and 2 (402, 404), through L2 network 106, can result in a loop 400. In particular, loop 400 can form when the connections to the L2 network 106 on ToR ports 1 and 2 (402, 404) are set to belong to the same bridge domain ("BD") but different VLANs or EPGs, while the ToR ports 1 and 2 (402, 404) are marked on the L2 network 106 as part of the same VLAN.

For example, if the L2 network 106 is configured on ToR port 1 (402) as being on VLAN 50 and BD 1, while the L2 network 106 is configured on ToR port 2 (404) as being on the same BD 1 but VLAN 60 (as opposed to VLAN 50), and ToR ports 1 and 2 (402, 404) are both marked on the L2 network 106 as being on VLAN 50, this can result in the loop 400. Here, ToR ports 1 and 2 would be interconnected by the L2 network 106 in a triangle such that packets will traverse the connection in a loop.

In such a case, STP would not break the loop 400, as STP BPDUs are flooded over a VLAN, but not through the BD. Because STP BPDUs do not cross different VLANs, the switches in the L2 network 106 will not discover any BPDUs sent on one port (with that port's VLAN) over other ports. As such, the L2 network 106 will keep the ports in forwarding state. However, from the point of view of the fabric 112, both ports are part of the same flood-domain (same BD). Thus, the loop 400 will be formed and packets egressed through one of the ToR ports 1 and 2 will be returned to the fabric through the L2 network 106.

To detect loop 400 in this scenario, the leaf switches on the fabric 112 can be configured perform flood and learn operations as further described below.

Figure 5:
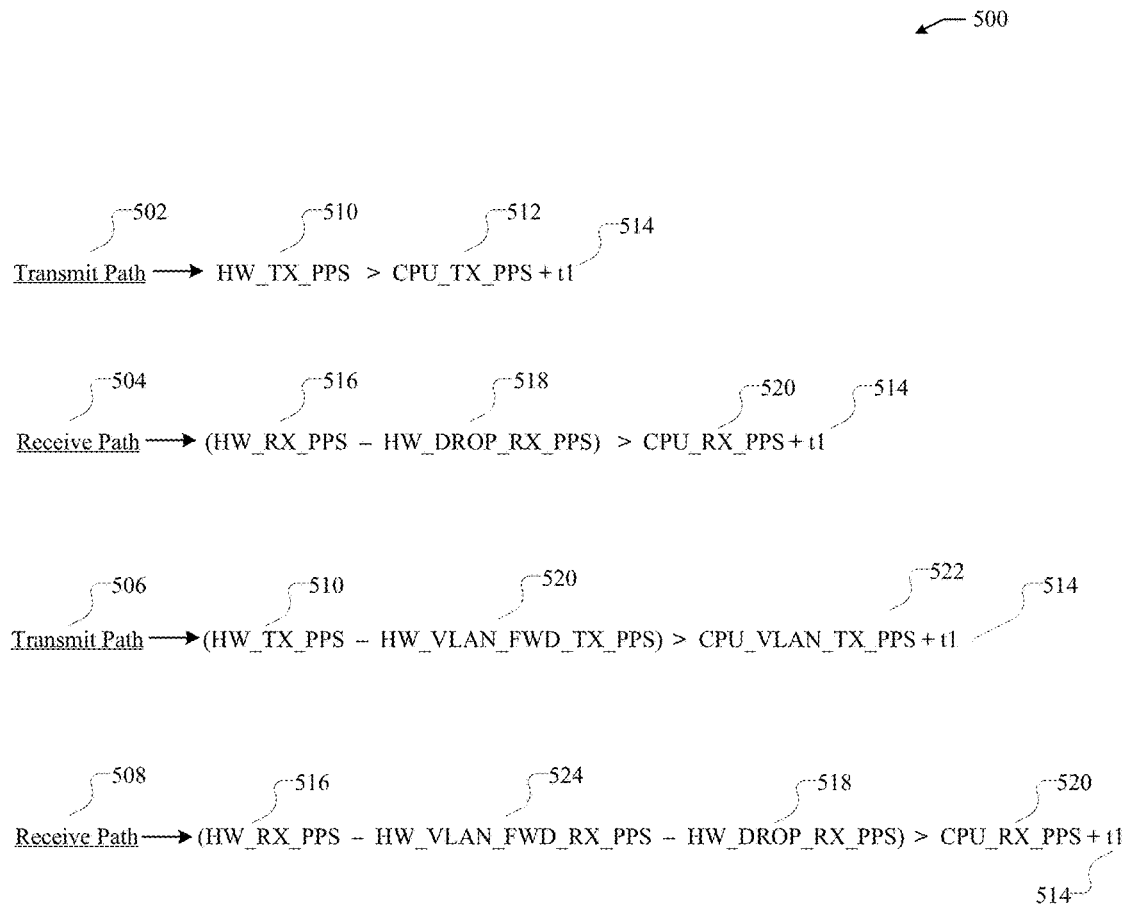
FIG. 5 illustrates example operations for detecting a loop.

FIG. 5 illustrates example operations 500 for detecting a loop. In some cases, the operations 500 can detect a loop generated as a result of a software bug on a port and/or device, for example.

Generally, blocked ports (e.g., STP blocked ports) carry only BPDU class of traffic (e.g., STP BPDU, LACP, LLDP, CDP, etc.). All of these packets are originated (TX) and/or terminated (RX) at the CPU (i.e., CPU PROCESS 204). Any other packets are expected to be dropped by hardware (e.g., ASIC 202). Packets coming in and going out of the CPU (e.g., CPU PROCESS 204) can be monitored, and data as well as traffic rates can be gathered for these ports and classes of traffic.

For example, the hardware (e.g., ASIC 202) of the network device 104 can obtain statistics for TX/RX packet counters and rate per port, VLAN TX/RX counters, drop counters, etc.

With the help of the CPU (e.g., CPU PROCESS 204) transmit/receive rate or statistics for the BPDU class of packets, we can determine the rate that is expected on the link for the given port and/or VLAN. Comparing this against the various hardware counters, including TX/RX rates, VLAN TX/RX rates, drop rates, etc., can help determine any extra packets transmitted/received on a blocked port(s) which may result in a Layer 2 loop.

Also, for a blocked port, if the interface receives a packet in CPU (e.g., CPU PROCESS 204) which is outside the BPDU class, then the CPU can mark this packet and/or port as a potential loop, as such packet outside of the BPDU class should not be received by the CPU PROCESS 204.

Legends for the operations 500 are as follows:

CPU_TX_PPS can refer to a rate or amount of packets transmitted from the CPU PROCESS 204 for BPDU traffic on a port.

CPU_RX_PPS can refer to a rate or amount of packets received in the CPU PROCESS 204 for BPDU traffic on a port.

HW_TX_PPS can refer to the rate or amount of packets transmitted by hardware (i.e., ASIC 202) on a port.

HW_RX_PPS can refer to a rate or amount of packets received by hardware (i.e., ASIC 202) (i.e., ASIC 202) on a port.

HW_DROP_RX_PPS can refer to a rate or amount of received packets dropped by hardware (i.e., ASIC 202) on a port.

HW_DROP_TX_PPS can refer to a rate or amount of transmit packets dropped by hardware (i.e., ASIC 202) on a port.

HW_VLAN_TX can refer to packets transmitted on a VLAN by a port.

HW_VLAN RX can refer to packets received on a VLAN by a port.

T1 can refer to a threshold of a packet rate or amount (e.g., 100 PPS). The threshold, t1, can be used to avoid incorrect reporting from anomalies, for example. Moreover, the threshold t1 can be optional, and may be adjusted based on a desired tolerance or sensitivity.

Turning now to the operations 500, network loops on the transmit path 502 can be detected for a port in a blocking state when HW_TX_PPS (510) is greater than CPU_TX_PPS (512)+t1 (514). In a stable state, the rate or amount of packets transmitted by hardware (i.e., ASIC 202) should be the same or substantially the same as the packets generated for the control or BPDU class from the CPU PROCESS 204. Thus, if HW_TX_PPS (510) is greater than CPU_TX_PPS (512)+t1 (514), then the port is transmitting extra packets (i.e., packets that are set to be blocked or dropped).

A blocked port can receive some traffic outside the control or BPDU class, as the port blocked state is local to the network device (e.g., leafs 104 or spines 102) and the other side/end of the communication may be forwarding. However, when in blocking state, these packets are expected to be dropped. Thus, network loops on the receive path 504 can be detected for a port in a blocking state when HW_RX_PPS (516)−HW_DROP_RX_PPS (518) is greater than CPU_RX_PPS (520)+t1 (514). That is, if HW_RX_PPS (516)−HW_DROP_RX_PPS (518) is greater than CPU_RX_PPS (520)+t1 (514), then the port is not dropping some or all of the packets outside of the control or BPDU class. This can be a result of a misconfiguration or error, such as a software bug, on the port.

The operations above for the transmit path 502 and receive path 504 can be calculated for access ports, which only have one VLAN on the port, and trunk ports where all of the VLANs in the trunk are marked as blocked.

However, in some scenarios, a trunk port can carry multiple VLANs, with some VLANs set in forwarding mode and other VLANs in blocking mode. In such scenarios, the operations can vary as follows.

On the VLAN transmit path 506, network loops can be detected when HW-TX_PPS (510)−HW_VLAN_FWD_TX_PPS (520) is greater than the sum of CPU_TX_PPS for blocked Vlans (CPU_VLAN_TX_PPS 522)+t1 (514), where HW_VLAN_FWD_TX_PPS (520) can refer to a rate or amount of traffic on VLANs for which the port is in forwarding state. The hardware (i.e., ASIC 202) can provide the VLAN level TX count, so we can consolidate all of the forwarding VLANs and determine the rate. Since these VLANs are in a forwarding state, such packets are expected to go out on the wire or link. If HW-TX_PPS (510)−HW_VLAN_FWD_TX_PPS (520) is greater than the sum of CPU_TX_PPS for blocked Vlans (522)+t1 (514), where HW_VLAN_FWD_TX_PPS (520), then the port is likely transmitting extra packets that should not be transmitted, which may indicate a loop.

Moreover, on the VLAN receive path 508, network loops can be detected when HW_RX_PPS (516)−HW_VLAN_FWD_RX_PPS (524)−HW_DROP_RX_PPS 518) is greater than CPU_RX_PPS (520)+t1 (514), where HW_VLAN_FWD_RX_PPS (524) can refer to the rate of traffic on VLANs for which the port is in forwarding state. For example, if HW_RX_PPS (516)−HW_VLAN_FWD_RX_PPS (524)−HW_DROP_RX_PPS 518) is greater than CPU_RX_PPS (520)+t1 (514), then the port is likely receiving extra packets which should, but are not, being dropped.

The hardware (i.e., ASIC 202) can provide the VLAN level RX count, so we can consolidate all of the forwarding VLANs and determine the rate. Since these VLANs are in a forwarding state, such packets are not expected to be blocked on the receive path 508.

Figures 6A, 6B:
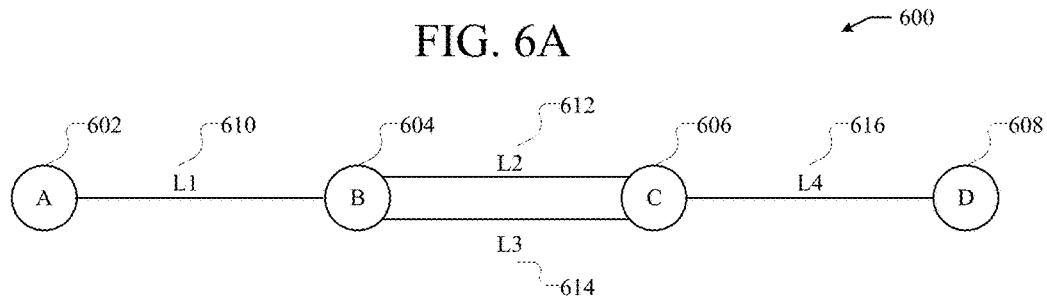
FIG. 6A illustrates a schematic diagram of an example path configured in a loop topology.
FIG. 6B illustrates a table of troubleshooting data for detecting a loop, compiled for nodes in the example path in FIG. 6A based on the node databases of each node in the path that is set in forwarding mode.

FIG. 6A illustrates a schematic diagram of an example path 600 configured in a loop topology. The loop topology for the path can result from a misconfiguration of one or more nodes (i.e., ports, switches, port channels, etc.), or a disabling of a protocol for preventing loops (e.g., STP). Path 600 includes nodes 602-608. Nodes 602-608 can include network devices (e.g., switches), ports, and/or port channels.

The nodes 602-608 in path 600 are all in a forwarding state. Accordingly, because the nodes 602-608 are in a forwarding state and at least two of the nodes 602-608; namely, nodes 604, 606, are interconnected by more than one link (links 612, 614), then nodes 602-608 are configured to create a loop in the path 600.

For example, in path 600, node A (602) is connected to node B (604) via link L1 (610). Thus, traffic received by node A (602) is forwarded on to node B (604) via the link L1 (610). Node B (604) is connected to node C (606) via link L2 (612) and link L3 (614). Traffic received by node B (604) is therefore forwarded to node C (606) via link L2 (612). Node C (606) is connected to node D (608) via link L4 (616). Accordingly, traffic received by node C from node B is forwarded to node D (608) via link L4 (616). However, because node C has a second link to node B, namely link L3 (614), then traffic received by node C from node B is also forwarded back to node B via link L3 (614), thereby forming a loop.

Moreover, the loop in path 600 can be detected as further described below in FIG. 6B.

Referring to FIG. 6B, troubleshooting data 650 can be compiled for detecting the loop in path 600 by traversing the path 600 at each of the nodes 602-608 and links L1-L4. The troubleshooting data 650 can include a database or table specifying the links or interconnections at each node in the path, as well as the next hop for each node.

The troubleshooting data 650 can be generated by traversing all of the links associated with the ports running in forwarding mode in the path 600 (e.g., nodes 602-608), and building a node database for each hop, and identifying the physical link(s) and next hop(s) at each node.

For example, the troubleshooting data 650 can include a seed node 652, node database 654, physical link 656, and next hop 658 (e.g., next hop port or switch). The information for fields 652-658 can be determined by traversing each link in the path 600.

To illustrate, we begin by traversing the link L1 (610) in path 600. Here, the seed node 652 is node A. The node database 654 for node A will include ['A'] which is the only node traversed so far in the path 600. Moreover, at this hop, the physical associated with node A is link L1, and the next hop for node A via link L1 is node B.

We then traverse the next link L2 (612) in path 600. Here, the seed node 652 is node B. The node database 654 for node B will include ['A', 'B'], which are the only nodes traversed so far in the path 600. At this hop, the physical link associated with node B is link L2, and the next hop for node B via link L2 is node C. We check to see if the next hop for node B via link L2 is listed in the node database 654 for node B. Since the next hop, node C, is not listed in the node database 654 for node B, then no loops are identified at this point.

Next we traverse link L4 (616) in the path 600. The seed node 652 at this point is node C. The node database 654 for node C will include ['A', 'B', 'C'], which are the nodes traversed so far in the path 600. At this hop, the physical link associated with node C is link L4, and the next hop for node C through link L4 is node D. We check to see if the next hop for node C through link L4 is listed in the node database 654 for node C. Since the next hop, node D, is not listed in the node database 654 for node C, then no loops are identified at this point.

We then traverse link L3 (614) in the path 600. The seed node 652 here is also node C. The node database 654 for node C will include ['A', 'B', 'C'], which are the nodes traversed so far in the path 600. The physical link at this hop is link L3, and the next hop through link L3 is node B. We check to see if the next hop for node C through link L3 is listed in the node database 654 for node C. Since the next hop, node B, is listed in the node database 654 for node C, then we detect a loop.

Thus, by comparing the node database field 654 and the next hop field 658 in the troubleshooting data 650, we can identify if there are any loops in the path involving the nodes in the seed node field 652. For example, we can detect a loop if the node listed in the next hop field 658 is also present in the node database field 654.

To remedy the loop in path 600, a port can be disabled or set to a blocking state, in order to block traffic through the link L2 (612) or link L3 (614) between node B (604) and node C (606). Moreover, when a loop is detected, one or more corrective and/or responsive actions can be taken, such as generating an alert or notification, disabling one or more ports or devices, transmitting an error, etc.

Figure 10:
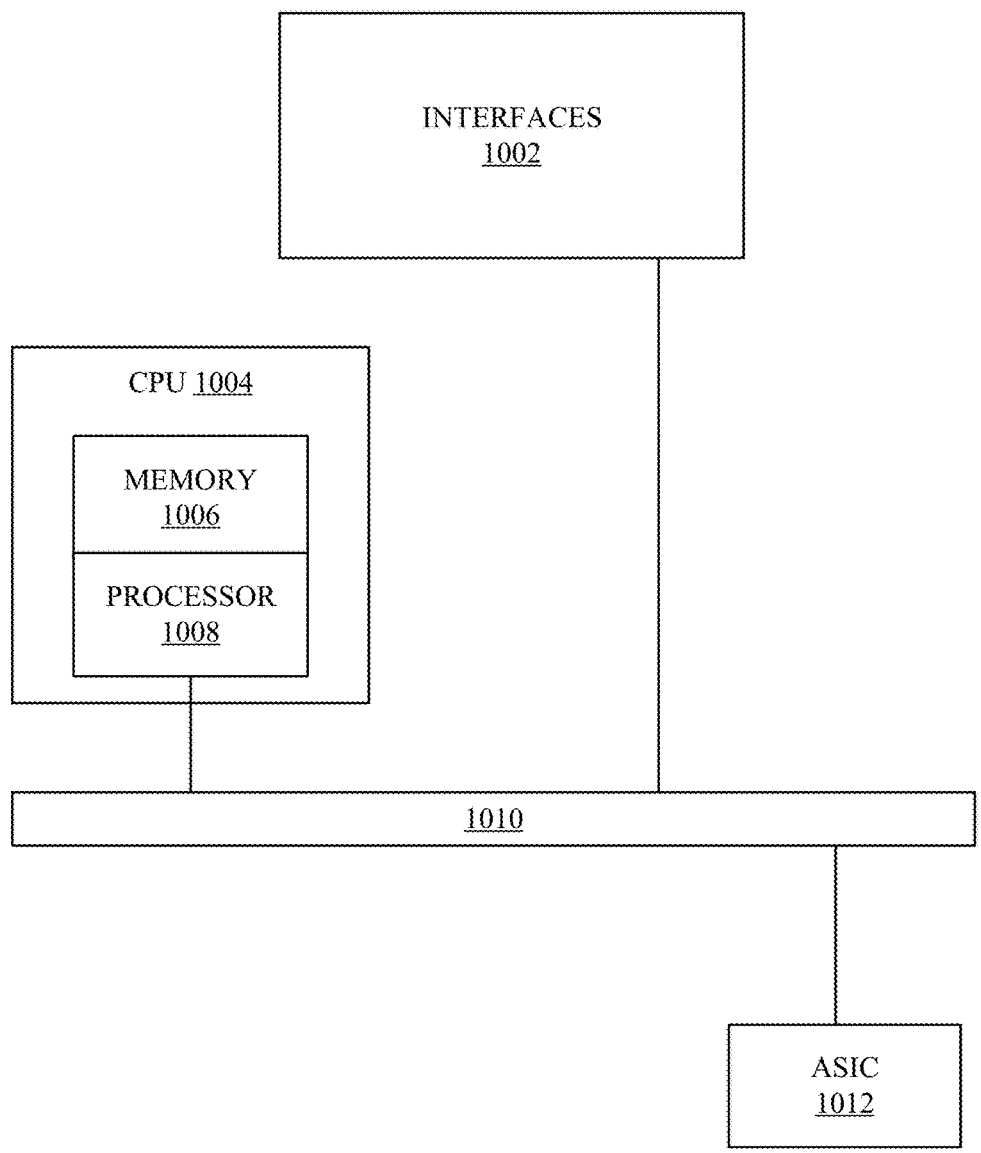
FIG. 10 illustrates a schematic diagram of an example network device.

Having disclosed some basic system components and concepts, the disclosure now turns to the exemplary method embodiments shown in FIGS. 7 and 10. For the sake of clarity, the methods are described in terms of FIGS. 1A, 1B, and 2. The steps outlined herein are exemplary and can be implemented in any combination thereof, including combinations that exclude, add, or modify certain steps.

Figure 7A:
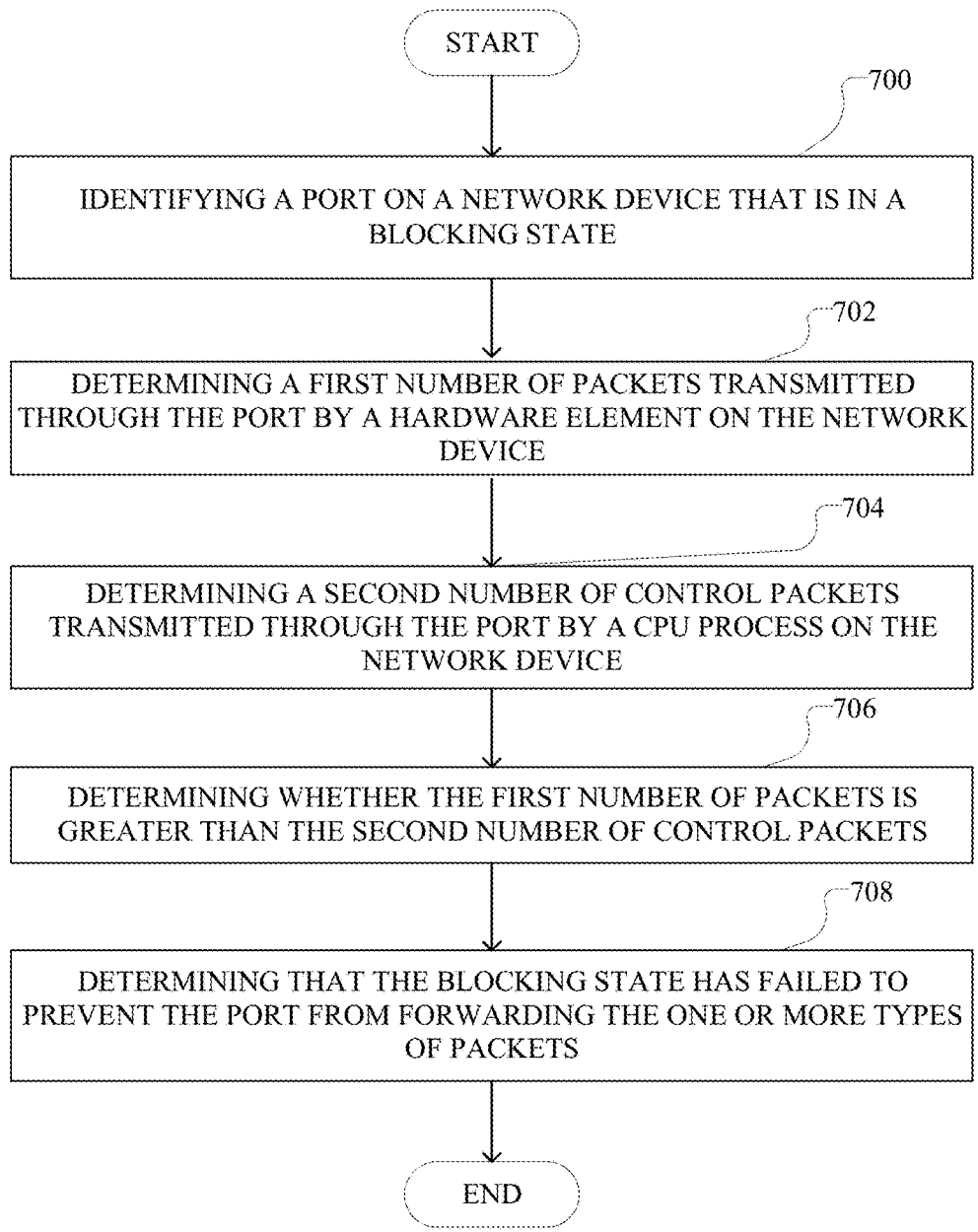
FIG. 7A illustrates a first example method for detecting loops involving ports set in blocking mode.

FIG. 7A illustrates a first example method for detecting loops involving ports set in blocking mode. At step 700, the method can include identifying a port, on a network device (e.g., leaf 104A), that is in a blocking state. The blocking state can be for dropping one or more types of packets, such as data packets or non-control packets, and preventing the port from forwarding the one or more types of packets.

At step 702, the method can include determining a first number of packets transmitted through the port by a hardware element (e.g., ASIC 202) on the network device (e.g., HW_TX_PPS). The packets can include control packets and/or data packets. Moreover, the first number of packets can refer to the rate and/or amount of packets transmitted via the port by hardware on the network device over a period of time. The hardware element can be an ASIC on the network device, which can receive and transmit packets via the port.

At step 704, the method can include determining a second number of control packets transmitted through the port by a CPU process (e.g., CPU PROCESS 204) on the network device (e.g., CPU_TX_PPS). The control packets can include bridge protocol data unit (BPDU) packets, link aggregation control protocol (LACP) packets, link layer discovery protocol (LLDP) packets, cisco discovery protocol (CDP) packets, or any other control packets.

At step 706, the method can include determining whether the first number of packets (i.e., from step 702) is greater than the second number of control packets (i.e., from step 704). This calculation can be represented by HW_TX_PPS>CPU_TX_PPS, as illustrated in FIG. 5. When the first number of packets is greater than the second number of control packets, at step 708, the method can include determining that the blocking state has failed to prevent the port from forwarding the one or more types of packets. In other words, the port has forwarded the one or more types of packets despite being set to block such packets. This can indicate a software bug where the port is forwarding packets that it is configured to block or drop.

In some configurations, the method can also incorporate a threshold value (e.g., t1) at step 706 added to the second number of control packets to prevent or limit the number of incorrect reportings (e.g., HW_TX_PPS>CPU_TX_PPS+t1). In this example, the blocking state is determined to fail when the first number of packets is greater than the second number of control packets plus the threshold value. Thus, the threshold value can ensure that a determination that the blocking state has failed is only made when the first number of packets exceeds the second number of control packets by more than a specific amount. This can prevent or limit the number/amount of false positives or incorrect readings.

For example, if the first number of packets only exceeds the second number of control packets by 5, such difference may be attributed to some anomaly other than a failure in the blocking state. Accordingly, if the threshold value is set to a number above 5, such as 50, then the difference of 5 in this example would not trigger a determination of a failure in the blocking state of the port. The threshold value can be adjusted based on the desired sensitivity, or fine-tuned based on historical data or past results, for example.

The port can be an access port or a trunk port with all VLANs on the port marked as blocked. In some cases, the port can also include different VLANs, with some VLANs marked as blocked and others marked as forwarding. VLAN counters can also be used if the port is carrying traffic for VLANs set on the port as forwarding.

For example, the method can include determining a third number of packets transmitted by the hardware element on VLANs for which the port is in forwarding state (e.g., HW_VLAN_FWD_TX_PPS).

The method can then include subtracting the third number of packets transmitted by the hardware element on VLANs for which the port is in forwarding state, from the first number of packets transmitted through the port by the hardware element. This subtraction can yield a subtracted number of packets. Next, the method can include determining whether the subtracted number of packets is greater than the second number of control packets transmitted by the CPU process through the port. This calculation can be represented by (HW_TX_PPS−HW_VLAN_FWD_TX_PPS)>the sum of CPU_TX_PPS for blocked Vlans, as illustrated in FIG. 5.

When the subtracted number is greater than the second number of control packets transmitted by the CPU process, the method can include determining that the blocking state has failed to prevent the port from forwarding the one or more types of packets. The subtracted number being greater than the second number of control packets transmitted by the CPU process can indicate that packets of the one or more types are being transmitted despite being set as blocked or dropped.

The subtraction can also take into account a threshold value (e.g., t1) to prevent or limit false positives or other anomalies. For example, the method can include determining whether the subtracted number of packets is greater than the second number of control packets transmitted by the CPU process through the port plus the threshold value (e.g., t1). The calculation can be represented by ((HW_TX_PPS−HW_VLAN_FWD_TX_PPS)>the sum of CPU_TX_PPS for blocked Vlans+t1), as illustrated in FIG. 5.

Figure 7B:
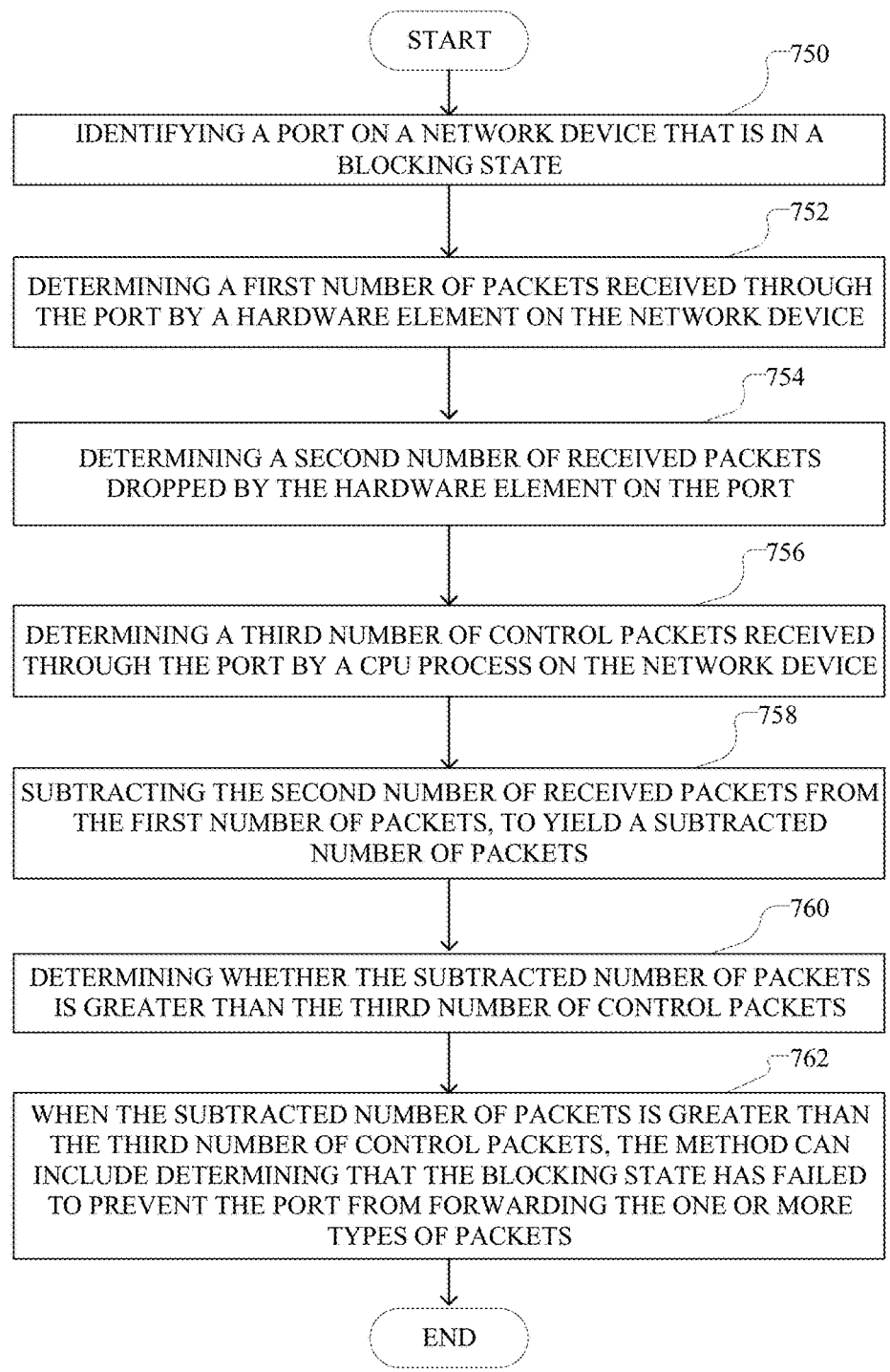
FIG. 7B illustrates a second example method for detecting loops involving ports set in blocking mode.

FIG. 7B illustrates a second example method for detecting loops involving ports set in blocking mode. At step 750, the method can include identifying a port on a network device (e.g., leaf 104A), that is in a blocking state. The blocking state can be for dropping one or more types of packets, such as any or all non-control packets, and preventing the port from forwarding the one or more types of packets.

At step 752, the method can include determining a first number of packets received through the port by a hardware element (e.g., ASIC 202) on the network device (e.g., HW_RX_PPS). At step 754, the method can include determining a second number of received packets dropped by the hardware element on the port (e.g., HW_DROP_RX_PPS).

At step 756, the method can include determining a third number of control packets received through the port by a CPU process (e.g., CPU PROCESS 204) on the network device (e.g., CPU_RX_PPS). At step 758, the method can include subtracting the second number of received packets from the first number of packets, to yield a subtracted number of packets (e.g., HW_RX_PPS−HW_DROP_RX_PPS).

At step 760, the method can include determining whether the subtracted number of packets is greater than the third number of control packets (e.g., HW_RX_PPS−HW_DROP_RX_PPS>CPU_RX_PPS). At step 762, when the subtracted number of packets is greater than the third number of control packets, the method can include determining that the blocking state has failed to prevent the port from forwarding the one or more types of packets.

The port can be an access port or a trunk port having all VLANs marked as blocked. However, in some cases, the port can include multiple VLANs, with at least one VLAN marked as forwarded and another VLAN marked as blocked. In such scenarios, VLAN counters can be used to determine loops.

For example, the method can include determining a fourth number of packets through the port on VLANs for which the port is in forwarding state (e.g., HW_VLAN_FWD_RX_PPS).

The method can then include subtracting the fourth number of packets on VLANs for which the port is in forwarding state (e.g., HW_VLAN_FWD_RX_PPS) and the second number of received packets dropped (e.g., HW_DROP_RX_PPS), from the first number of packets received by the hardware element on the port (e.g., HW_RX_PPS), to yield a subtracted number of packets.

The method can include determining whether the subtracted number of packets is greater than the third number of control packets received by the CPU process through the port (e.g., HW_RX_PPS−HW_VLAN_FWD_RX_PPS−HW_DROP_RX_PPS for blocked Vlans>the sum of CPU_RX_PPS for blocked Vlans). In some cases, the method can also include a threshold value (e.g., t1) added to the fourth number of control packets received by the CPU process.

When the subtracted number is greater than the third number of control packets received by the CPU process, the method can include determining that the blocking state has failed to cause the port to drop the one or more types of packets. In some cases, a threshold value can be included in the calculation such that the blocking state is determined to have failed when the subtracted number is greater than the fourth number of control packets received by the CPU process plus the threshold value.

Figure 8:
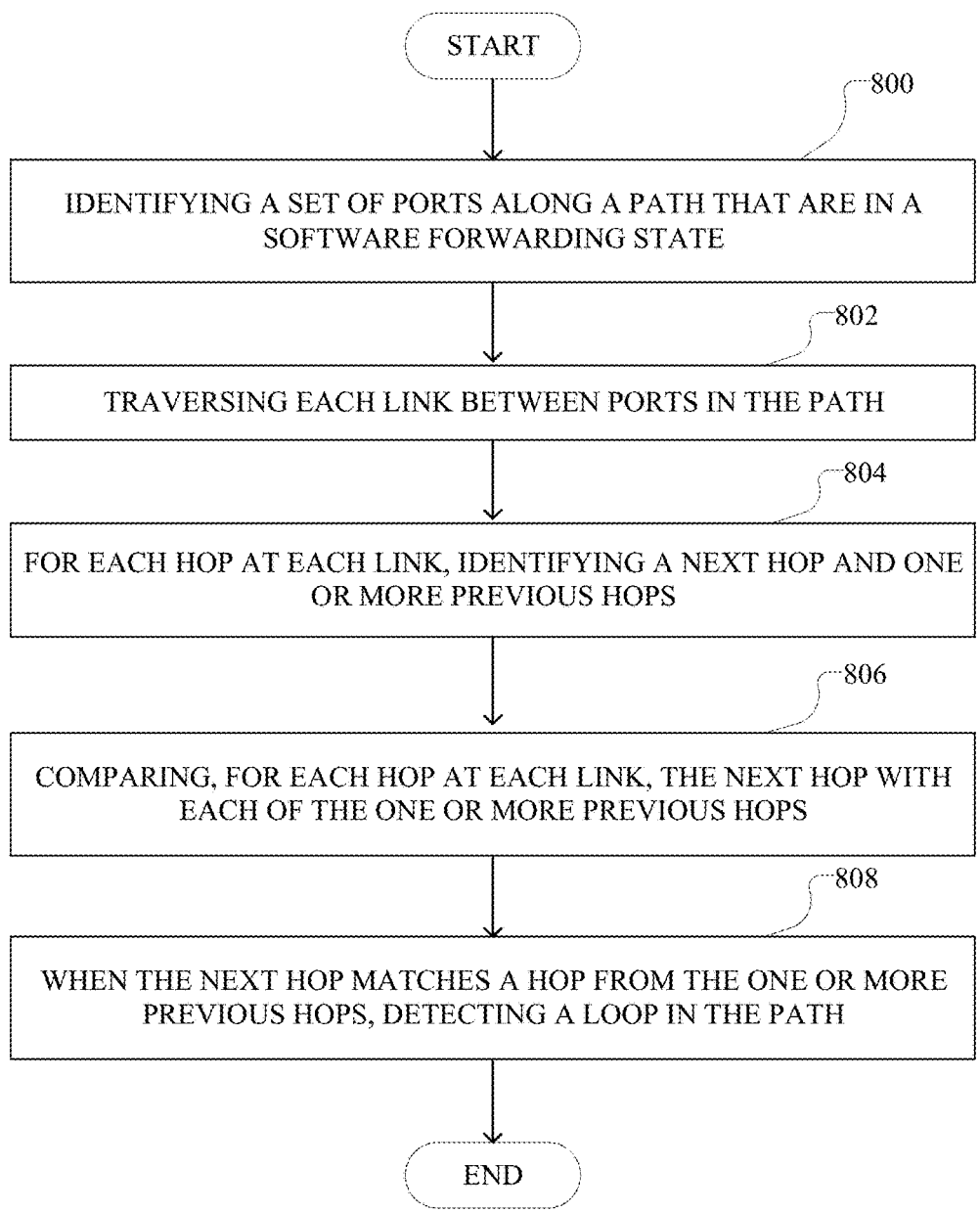
FIG. 8 illustrates an example method for detecting a loop in a path with ports set in a forwarding mode.

FIG. 8 illustrates an example method for detecting a loop in a path with ports set in a forwarding mode. At step 800, the method can include identifying a set of ports (e.g., nodes 602-608) along a path (e.g., path 600) that are in a software forwarding state.

At step 802, the method can include traversing each link (e.g., links L1-L4 610-616) between ports in the path. Traversing each link can mean following each link in the path, identifying each link in the path, identifying each hop along the path, identifying the sequence of hops along the path, understanding the flow of communications through the links in the path, preparing to follow the links in the path to ascertain information at each hop as further described below, and/or any other analysis of the links in the path.

At step 804, the method can include, for each hop at each link, identifying a next hop (e.g., next hop 658) and one or more previous hops (e.g., node database 654).

At step 806, the method can include comparing, for each hop at each link, the next hop with each of the one or more previous hops. When the next hop matches a hop from the one or more previous hops, at step 808, the method can include detecting a loop in the path (e.g., path 600).

When the loop is identified, the method can include generating an alert or notification to inform a user or device that a loop has been detected in the path. The method can also include setting one or more ports in the path to blocking state. In particular, the method can include setting the port causing the loop to blocking state in order to break the loop.

Figure 9A:
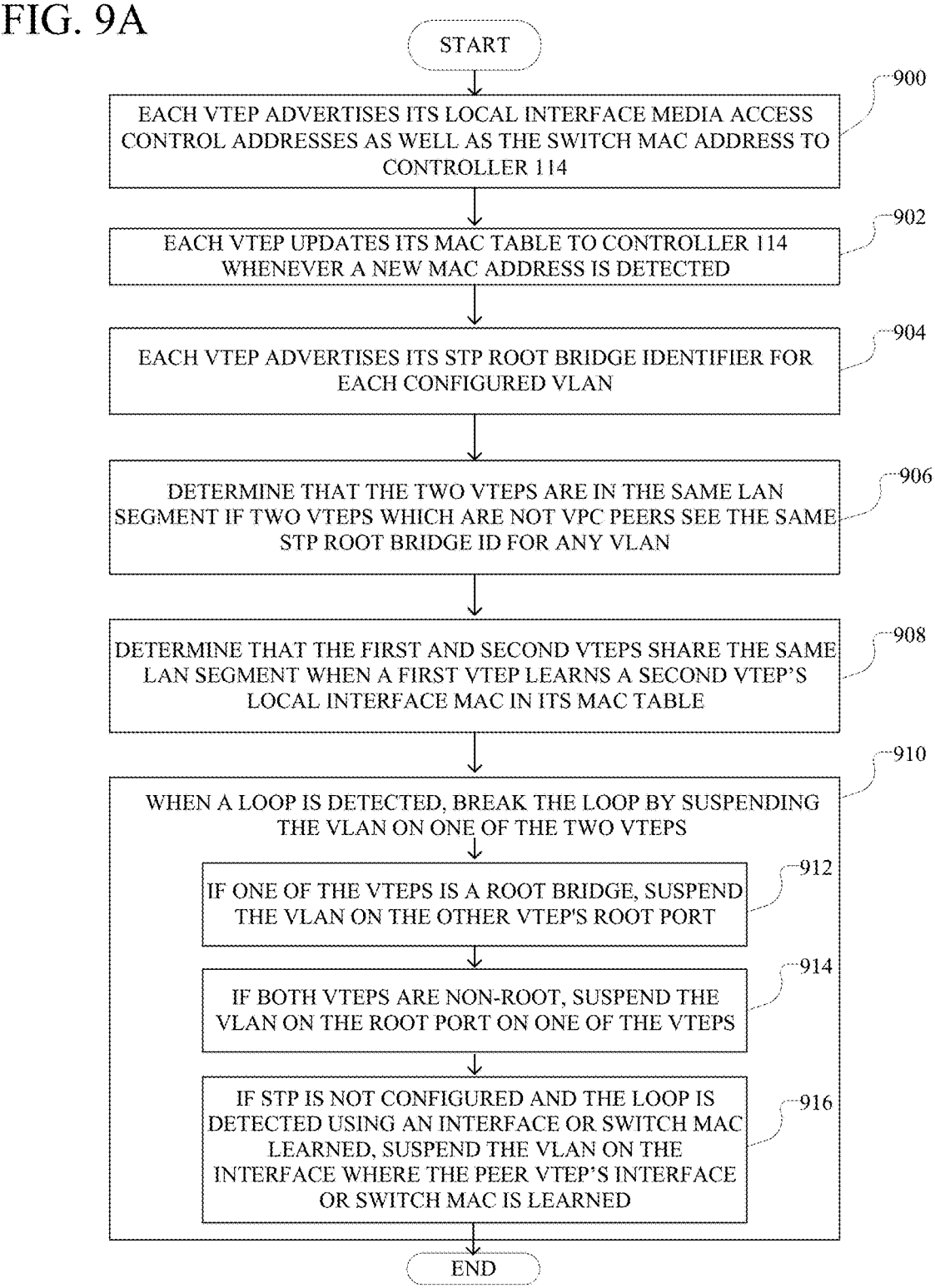
FIG. 9A illustrates a first example method for detecting a loop between two or more virtual tunnel endpoints.

FIG. 9A illustrates a first example method for detecting a loop between two or more virtual tunnel endpoints. The virtual tunnel endpoints (VTEPs) can be physical and/or virtual systems (e.g., leafs 104 and/or VTEPs 158A-D) configured to encapsulate/decapsulate packets for communication between an underlay, such as fabric 112, and an overlay, such as overlay network 150. As used herein, the VTEPs are not necessarily limited to any specific overlay protocol, such as VXLAN, and can be implemented in any overlay technology or protocol, including current overlay protocols and technologies as well as future overlay technologies and protocols.

This example method can use flood and learn or EVPN with a controller to detect a loop. EVPN (Ethernet VPN) enables the connection of a group of dispersed customer sites or datacenters using a Layer 2 (L2) virtual bridge.

At step 900, each VTEP (e.g., leafs 104) advertises all its local interface media access control (MAC) addresses as well as the switch MAC address to controller 114. For example, if VTEP 104A has 32 local interfaces, it would advertise the MAC addresses for those 32 interfaces as well as the VTEP's switch MAC address, thereby advertising 33 MAC addresses. These updates or advertisements can be transmitted periodically, on a schedule, or in response to an event. For example, the updates or advertisements can be sent whenever the VTEP boots up, whenever a switch is configured or enabled to run as a VTEP, or whenever there is any configuration changes to the local interface MAC addresses, such as user defined MAC addresses.

At step 902, each VTEP updates its MAC table to controller 114 whenever a new MAC address is detected. At step 904, each VTEP advertises its STP root bridge identifier (ID) for each configured VLAN. Updates can be sent everytime the STP bridge ID changes, a new VLAN is added, a root bridge is elected, and so forth.

The controller 114 can use this information to then detect a loop as follows.

At step 906, if two VTEPs are not vPC peers (e.g., in a virtual port etherchannel or virtual port channel (vPC)), or multi-homed peers (i.e., according to a multi-homed scenario as described in RFC 7432 which is incorporated by reference herein in its entirety), and the two VTEPs see the same STP root bridge ID for any VLAN, then the controller 114 determines that the two VTEPs share the same LAN segment (e.g., are in the same LAN segment). If two VTEPs share a same local LAN segment or have a connection to the same local LAN segment, such configuration can cause an L2 loop. Thus, by determining that the two VTEPS are share the same LAN segment, the controller 114 infers that the VTEPs are configured in a loop.

At step 908, when a first VTEP (e.g., leaf 104A) learns a second VTEP's (e.g., leaf 104B) local interface MAC in its MAC table, the controller 114 can determine that the first and second VTEPs share the same LAN segment (e.g., are in the same LAN segment), and are thus configured in a loop. An exception can be if the first and second VTEPs are multihomed peers (e.g., multihoming according to RFC 7432). If the VTEPs are multihomed peers, the VTEPs would be able to learn each other when no loop exists.

Another exception can be when the first and second VTEPs are vPC peers. For example, if the VTEPs are vPC peers, the VTEPs can learn each other on an MCT (multi-chassis trunk). However, if the vPC peers learn each other on any interface other than the MCT, such vPC peers should be treated as a loop between the vPC peers.

At step 910, when the controller 114 detects a loop, it can break the loop by suspending the VLAN on one of the two VTEPs as follows. At step 912, if one of the VTEPs is a root bridge, then the controller 114 can suspend the VLAN on the other VTEP's root port. At step 914, if both VTEPs are non-root, then the controller 114 can suspend the VLAN on the root port on one of the VTEPs. The controller 114 can use the VTEP's IP to decide which VLAN should be suspended. In some examples, the VTEP with the lowest VTEP IP can be the designated one and on the other VTEP the VLAN can be suspended.

At step 916, if STP is not configured and the loop is detected using an interface or switch MAC learned, then the controller 114 can suspend the VLAN on the interface where the peer VTEP's interface or switch MAC is learned. The same VTEP ID as the tie-breaker can be used to decide on which VTEP the VLAN should be suspended.

Figure 9B:
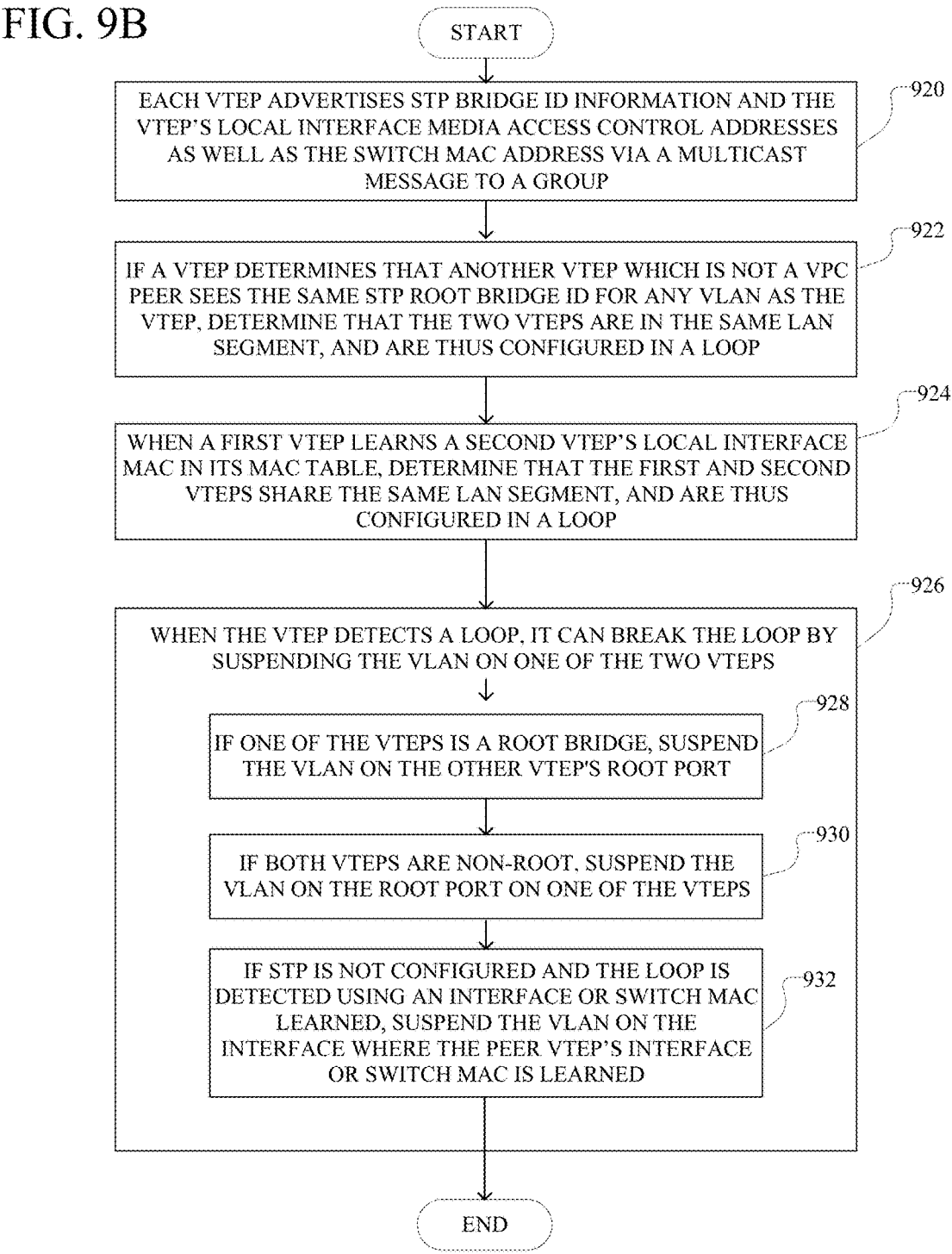
FIG. 9B illustrates a second example method for detecting a loop between two or more virtual tunnel endpoints.

FIG. 9B illustrates a second example method for detecting a loop between two or more virtual tunnel endpoints. This example method can use flood and learn without a controller to detect a loop. At step 920, each VTEP (e.g., leafs 104) advertises all its local interface media access control (MAC) addresses as well as the switch MAC address via a message to a multicast group. The message can be over a UDP port number that all of the VTEPs are aware of. Along with this, each VTEP should advertise it's STP root bridge ID as well for each configured VLAN via a message to a multicast group.

Once the information is exchanged across the VTEPs, each VTEP can use this information to then detect a loop as follows.

At step 922, if a VTEP determines that another VTEP is not a vPC peer or a multihomed VTEP (e.g., multihomed as described in RFC 7432), and the VTEP sees the same STP root bridge ID for any VLAN as the other VTEP, then the VTEP can determine that the two VTEPs are in the same LAN segment, and are thus configured in a loop.

At step 924, when a first VTEP (e.g., leaf 104A) learns a second VTEP's (e.g., leaf 104B) local interface MAC in its MAC table, the first VTEP can determine that the first and second VTEPs share the same LAN segment, and are thus configured in a loop. An exception can be if the first and second VTEPs are multi-homed peers, the VTEPs would be able to learn each other.

Another exception can be when the first and second VTEPs are vPC peers. For example, if the VTEPs are vPC peers, the VTEPs can learn each other on an MCT. However, if the vPC peers learn each other on any interface other than the MCT, such vPC peers should be treated as a loop between the vPC peers.

At step 926, when the VTEP detects a loop, it can break the loop by suspending the VLAN on one of the two VTEPs as follows. At step 928, if one of the VTEPs is a root bridge, then the VTEPs can suspend the VLAN on the root port of the VTEP that is not a root bridge. At step 930, if both VTEPs are non-root, then the VTEPs can suspend the VLAN on the root port on one of the VTEPs. The VTEP's IP can be used to decide which VLAN should be suspended. In some examples, the VTEP with the lowest VTEP IP can be the designated one and on the other VTEP the VLAN can be suspended.

At step 932, if STP is not configured and the loop is detected using an interface or switch MAC learned, then the VTEP can suspend the VLAN on the interface where the peer VTEP's interface or switch MAC is learned. The same VTEP ID as the tie-breaker can be used to decide on which VTEP the VLAN should be suspended.

Figure 9C:
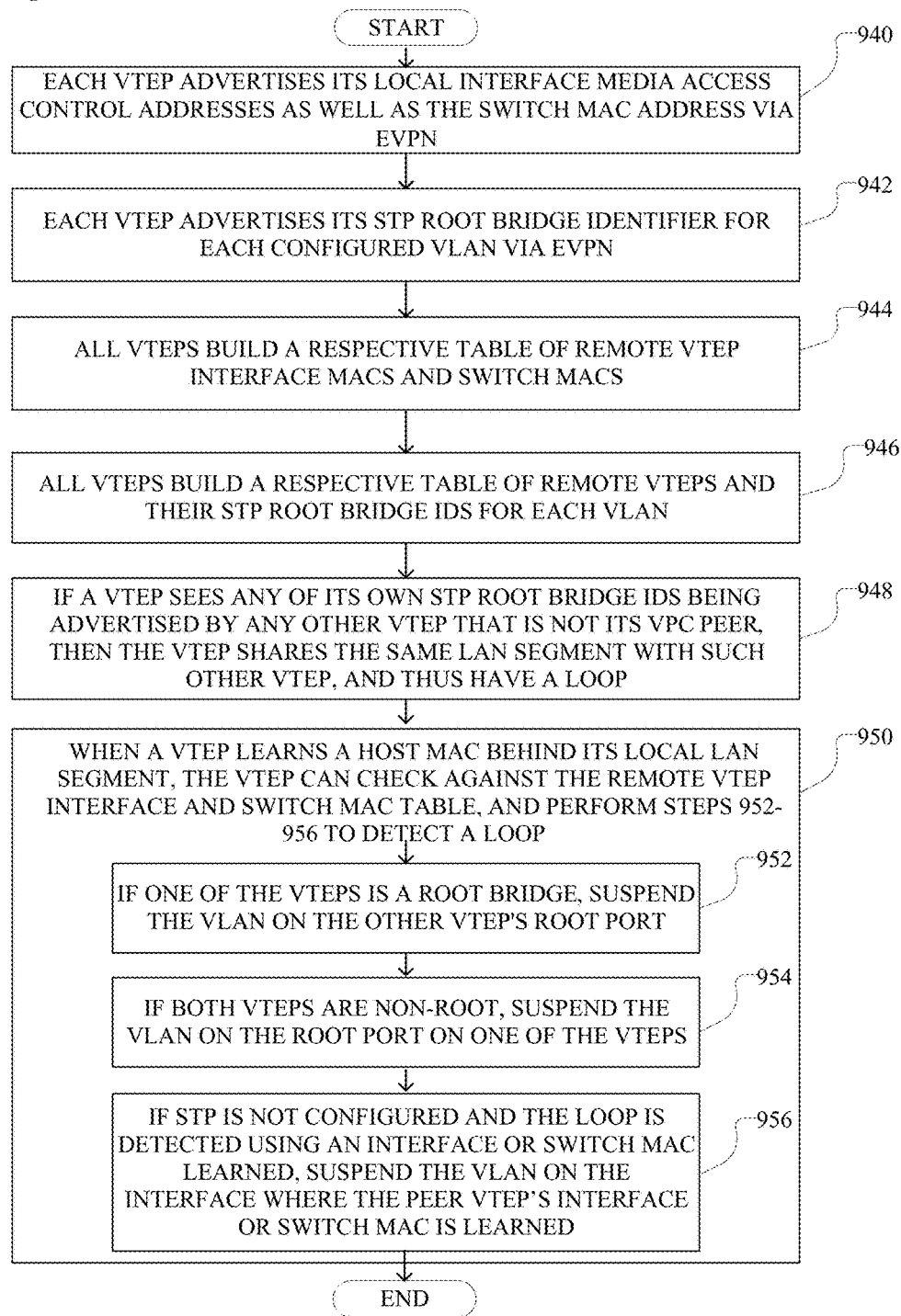
FIG. 9C illustrates a third example method for detecting a loop between two or more virtual tunnel endpoints.

FIG. 9C illustrates a third example method for detecting a loop between two or more virtual tunnel endpoints. This example method can use EVPN without a controller to detect a loop.

At step 940, each VTEP advertises all its own interface MACs and switch MAC over EVPN. At step 942, each VTEP advertises its STP root bridge ID for each VLAN over EVPN. At step 944, all the VTEPs build a respective table of remote VTEP interface MACs and switch MACs. At step 946, all the VTEPs build a respective table of remote VTEPs and their STP root bridge IDs for each VLAN.

At step 948, if a VTEP sees any of its own STP root bridge IDs being advertised by any other VTEP that is not its a vPC peer or multihomed with that VTEP, then the VTEP shares the same LAN segment with such other VTEP, and thus have a loop.

At step 950, when a VTEP learns a host MAC behind its local LAN segment, the VTEP can check against the remote VTEP interface and switch MAC table, and perform steps 952-956 to detect a loop.

Figure 9D:
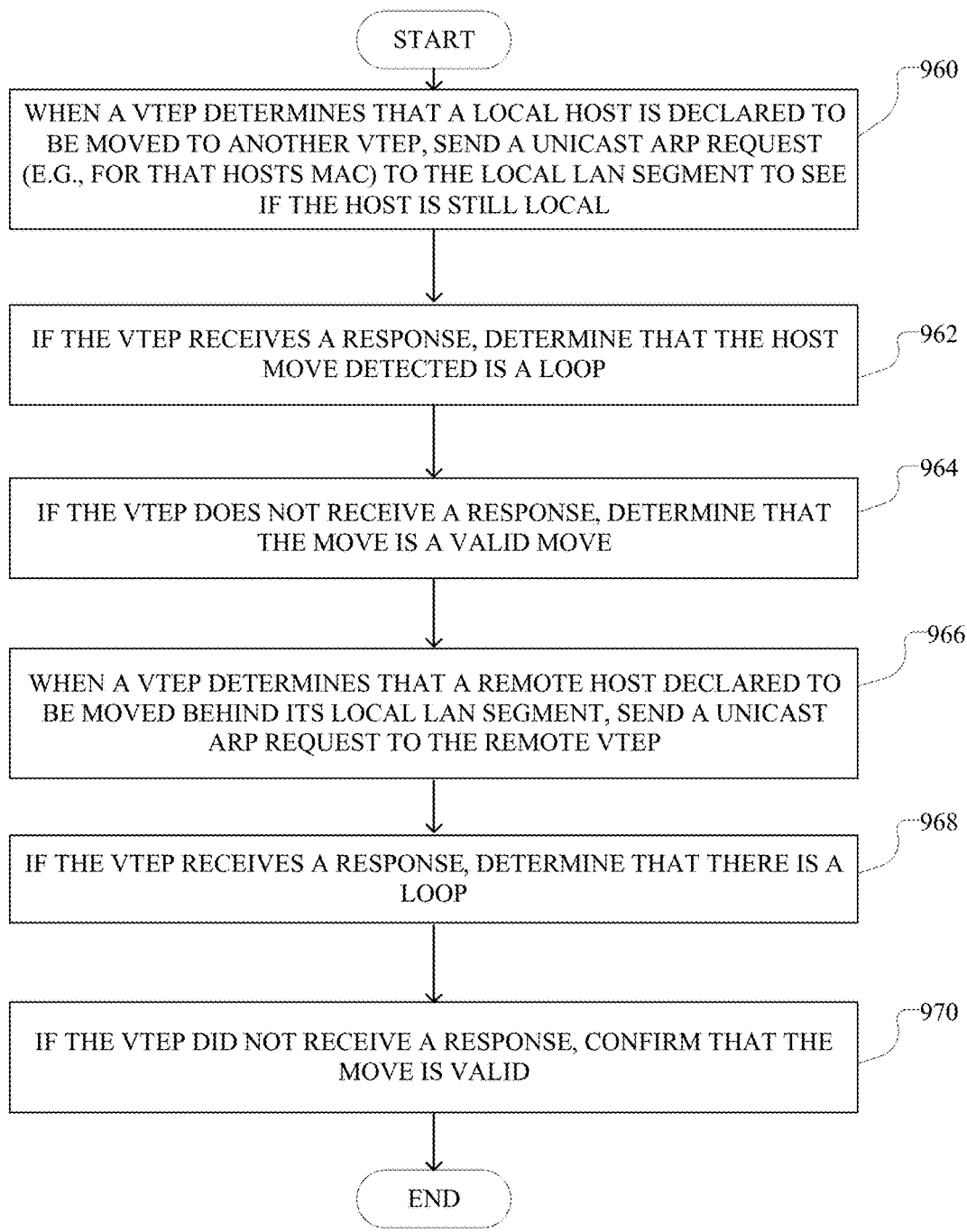
FIG. 9D illustrates a fourth example method embodiment for detecting a loop.

FIG. 9D illustrates a fourth example method embodiment for detecting a loop. The method can allow a loop to be detected by validating a host (e.g., 110A) MAC move is a legitimate move by sending a unicast ARP request to the local LAN segment. A host move can happen in various ways. For example, a host move can include the same IP but different MAC (e.g., VMOTION), or same IP and same MAC.

At step 960, when a VTEP determines that a local host is declared to be moved to another VTEP (e.g., by MAC move or EVPN route advertisements), it can send a unicast ARP request (e.g., for that hosts MAC) to the local LAN segment (e.g., network 106) to see if the host is still local.

At step 962, if the VTEP receives a response, then the loop is detected. At step 964, if the VTEP does not receive a response, then the move is a valid move.

At step 966, when a VTEP determines that a remote host declared to be moved behind its local LAN segment, the VTEP can send a unicast ARP request to the remote VTEP.

At step 968, if the VTEP receives a response (e.g., from the remote VTEP or the local LAN segment), then VTEP determines that there is a loop. In response, a VLAN can be suspended as previously mentioned to break the loop.

At step 970, if the VTEP did not receive a response, then the VTEP confirms that the move is valid.

FIG. 10 illustrates an example network device 1000 suitable for high availability and failover. Network device 1000 can include a master central processing unit (CPU) 1004, interfaces 1002, and a bus 1010 (e.g., a PCI bus). When acting under the control of appropriate software or firmware, the CPU 1004 can be responsible for executing packet management, error detection, and/or routing functions. The CPU 1004 can accomplish all these functions under the control of software including an operating system and any appropriate applications software. CPU 1004 may include one or more processors 1008, such as a processor from the Motorola family of microprocessors or the MIPS family of microprocessors. In an alternative configuration, processor 1008 is specially designed hardware for controlling the operations of the network device 1000. In some cases, a memory 1006 (such as non-volatile RAM, ROM, TCAM, etc.) can also form part of CPU 1004. However, there are many different ways in which memory could be coupled to the network device 1000.

The interfaces 1002 can be provided as interface cards (sometimes referred to as "line cards").

Generally, the interfaces 1002 can control the sending and receiving of packets over the network, and support other peripherals used with the network device 1000. Among the interfaces that may be provided are Ethernet interfaces, frame relay interfaces, cable interfaces, DSL interfaces, token ring interfaces, Layer 1 interfaces, fiber optic interfaces, and so forth. In addition, various very high-speed interfaces may be provided such as fast token ring interfaces, wireless interfaces, Ethernet interfaces, Gigabit Ethernet interfaces (e.g., 10, 25, 40, 50, 100 GbE, etc.), ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1004 to efficiently perform routing computations, network diagnostics, security functions, etc.

The network device 1000 can also include an application specific integrated circuit or ASIC 1012. The ASIC 1012 can communicate with other components in the network device 1000 (e.g., interfaces 1002, CPU 1004, memory 1006, processor 1008, etc.) via the bus 1010. The ASIC 1012 can be an integrated circuit customized for a particular use, such as routing operations, including forwarding operations.

Although the system shown in FIG. 3 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 1006) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

FIG. 11A and FIG. 11B illustrate example system embodiments. The more appropriate embodiment will be apparent to those of ordinary skill in the art when practicing the present technology. Persons of ordinary skill in the art will also readily appreciate that other system embodiments are possible.

FIG. 11A illustrates a conventional system bus computing system architecture 1100 wherein the components of the system are in electrical communication with each other using a bus 1106. Exemplary system 1100 includes a processing unit (CPU or processor) 1104 and a system bus 1106 that couples various system components including the system memory 1120, such as read only memory (ROM) 1118 and random access memory (RAM) 1116, to the processor 1104. The system 1100 can include a cache of high-speed memory connected directly with, in close proximity to, or integrated as part of the processor 1104. The system 1100 can copy data from the memory 1120 and/or the storage device 1108 to the cache 1102 for quick access by the processor 1104. In this way, the cache can provide a performance boost that avoids processor 1104 delays while waiting for data. These and other modules can control or be configured to control the processor 1104 to perform various actions. Other system memory 1120 may be available for use as well. The memory 1120 can include multiple different types of memory with different performance characteristics. The processor 1104 can include any general purpose processor and a hardware module or software module, such as module 1 1110, module 2 1112, and module 3 1114 stored in storage device 1108, configured to control the processor 1104 as well as a special-purpose processor where software instructions are incorporated into the actual processor design. The processor 1104 may essentially be a completely self-contained computing system, containing multiple cores or processors, a bus, memory controller, cache, etc. A multi-core processor may be symmetric or asymmetric.

To enable user interaction with the computing device 1100, an input device 1122 can represent any number of input mechanisms, such as a microphone for speech, a touch-sensitive screen for gesture or graphical input, keyboard, mouse, motion input, speech and so forth. An output device 1124 can also be one or more of a number of output mechanisms known to those of skill in the art. In some instances, multimodal systems can enable a user to provide multiple types of input to communicate with the computing device 1100. The communications interface 1126 can generally govern and manage the user input and system output. There is no restriction on operating on any particular hardware arrangement and therefore the basic features here may easily be substituted for improved hardware or firmware arrangements as they are developed.

Storage device 1108 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1116, read only memory (ROM) 1118, and hybrids thereof.

The storage device 1108 can include software modules 1110, 1112, 1114 for controlling the processor 1104. Other hardware or software modules are contemplated. The storage device 1108 can be connected to the system bus 1106. In one aspect, a hardware module that performs a particular function can include the software component stored in a computer-readable medium in connection with the necessary hardware components, such as the processor 1104, bus 1106, output device (e.g., display) 1124, and so forth, to carry out the function.

The system 1100 can also include an application specific integrated circuit or ASIC 1128. The ASIC 1128 can communicate with other components in the system 1100 (e.g., components 1102-1126) via the bus 1106. The ASIC 1128 can be an integrated circuit customized for a particular use, such as routing operations, including forwarding operations.

FIG. 11B illustrates an example computer system 1150 having a chipset architecture that can be used in executing the described method and generating and displaying a graphical user interface (GUI). Computer system 1150 is an example of computer hardware, software, and firmware that can be used to implement the disclosed technology. System 1150 can include a processor 1152, representative of any number of physically and/or logically distinct resources capable of executing software, firmware, and hardware configured to perform identified computations. Processor 1152 can communicate with a chipset 1154 that can control input to and output from processor 1152. In this example, chipset 1154 outputs information to output device 1162, such as a display, and can read and write information to storage device 1164, which can include magnetic media, and solid state media, for example. Chipset 1154 can also read data from and write data to RAM 1166. A bridge 1156 for interfacing with a variety of user interface components 1158 can be provided for interfacing with chipset 1154. Such user interface components 1158 can include a keyboard, a microphone, touch detection and processing circuitry, a pointing device, such as a mouse, and so on. In general, inputs to system 1150 can come from any of a variety of sources, machine generated and/or human generated.

Chipset 1154 can also interface with one or more communication interfaces 490 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1152 analyzing data stored in storage 1164 or 1166. Further, the machine can receive inputs from a user via user interface components 1158 and execute appropriate functions, such as browsing functions by interpreting these inputs using processor 1152.

It can be appreciated that example systems 1100 and 1150 can have more than one processor or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

For clarity of explanation, in some instances the present technology may be presented as including individual functional blocks including functional blocks comprising devices, device components, steps or routines in a method embodied in software, or combinations of hardware and software.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

What is claimed is:

1. A method comprising:
identifying a network path having a plurality of hops, the plurality of hops comprising respective nodes, wherein the respective nodes are all configured in a forwarding mode;
traversing at least a portion of the network path to identify, for each node from the respective nodes, a respective next hop;
based on the respective next hop for each node, determining whether a network loop exists in the network path based on two or more nodes from the respective nodes have a same respective next hop, wherein the network loop would until broken indefinitely forward a packet repeatedly around the loop; and
breaking, in response to the determining, the network loop.

2. The method of claim 1, wherein the respective nodes comprise ports set in forwarding mode, wherein each of the ports is associated with a respective switch.

3. The method of claim 2, wherein the network comprises a virtual local area network, wherein determining that the network path has the network loop comprises determining that the virtual local area network has the network loop.

4. The method of claim 3, further comprising:
identifying a respective network path for each of a plurality of virtual local area networks in the network, the respective network path comprising a respective plurality of hops, the respective plurality of hops being comprising a respective plurality of nodes, the respective plurality of nodes being configured in the forwarding mode;
traversing each respective network path to identify, for each respective node in the respective plurality of nodes, a second respective next hop;
based on the second respective next hop for each respective node, determining whether two or more nodes from the respective plurality of nodes have a particular next hop in common; and
when the two or more nodes have the particular next hop in common, determining that the respective virtual local area network has a respective network loop.

5. The method of claim 1, further comprising:
recording, for each node from the respective nodes, the respective next hop in a respective next hop field in a database; and
wherein determining whether two or more nodes from the respective nodes have the same respective next hop comprises:
comparing, for each node from the respective nodes, the respective next hop field in the database to yield a comparison; and
based on the comparison, determining whether the same respective next hop is listed in the respective next hop field associated with the two or more of the respective nodes.

6. The method of claim 5, further comprising:
when the same respective next hop is listed in the respective next hop field:
determining that the two or more respective nodes have the same respective next hop; and
determining that the network loop comprises the two or more of the respective nodes.

7. The method of claim 1, wherein the network path comprises a plurality of links connecting the plurality of hops, each of the respective nodes being associated with at least one of respective link from the plurality of links, wherein identifying the respective next hop for each node comprises identifying the respective next hop for each respective link of each node.

8. The method of claim 1, wherein the network path comprises a plurality of links connecting the plurality of hops, wherein a node from the respective nodes is associated with a first link and a second link from the plurality of links, wherein the first link and the second link connect the node to different next hops.

9. The method of claim 8, wherein one of the different next hops is the same respective next hop, and wherein the node is one of the two or more nodes having the same respective next hop.

10. The method of claim 9, wherein the same respective next hop is a second node from the respective nodes, the method further comprising determining that the network loop is between the node and the second node.

11. A system comprising:
one or more processors; and
a computer-readable medium having stored therein instructions which, when executed by the one or more processors, cause the one or more processors to perform operations comprising:
identifying a network path having a plurality of hops, the plurality of hops comprising respective nodes, wherein the respective nodes are all configured in a forwarding mode;
traversing at least a portion of the network path to identify, for each node from the respective nodes, a respective next hop;
based on the respective next hop for each node, determining a network loop exists in the network path based on whether two or more nodes from the respective nodes have a same respective next hop, wherein the network loop would until broken indefinitely forward a packet repeatedly around the loop; and
breaking, in response to the determining, the network.

12. The system of claim 11, wherein the respective nodes comprise ports set in forwarding mode, each of the ports being associated with a respective switch, wherein the network comprises a virtual local area network, wherein determining that the network path has the network loop comprises determining that the virtual local area network has the network loop.

13. The system of claim 11, wherein the computer-readable medium stores additional instructions which, when executed by the one or more processors, cause the one or more processors to perform operations comprising:
identifying a respective network path for each of a plurality of virtual local area networks in the network, the respective network path comprising a respective plurality of hops, the respective plurality of hops being comprising a respective plurality of nodes, the respective plurality of nodes being configured in the forwarding mode;
traversing each respective network path to identify, for each respective node in the respective plurality of nodes, a second respective next hop;
based on the second respective next hop for each respective node, determining whether two or more nodes from the respective plurality of nodes have a particular next hop in common; and when the two or more nodes have the particular next hop in common, determining that the respective virtual local area network has a respective network loop.

14. The system of claim 11, wherein the computer-readable medium stores additional instructions which, when executed by the one or more processors, cause the one or more processors to perform operations comprising:
recording, for each node from the respective nodes, the respective next hop in a respective next hop field in a database; and
wherein determining whether two or more nodes from the respective nodes have the same respective next hop comprises:
comparing, for each node from the respective nodes, the respective next hop field in the database to yield a comparison; and
based on the comparison, determining whether the same respective next hop is listed in the respective next hop field.

15. The system of claim 14, wherein the computer-readable medium stores additional instructions which, when executed by the one or more processors, cause the one or more processors to perform operations comprising:
when the same respective next hop is listed in the respective next hop field:
determining that the two or more nodes have the same respective next hop; and
determining that the network path has the network loop.

16. The system of claim 11, wherein the network path comprises a plurality of links connecting the plurality of hops, wherein a node from the respective nodes is associated with a first link and a second link from the plurality of links, wherein the first link and the second link connect the node to different next hops, wherein one of the different next hops is the same respective next hop, and wherein the node is one of the two or more nodes having the same respective next hop.

17. A non-transitory computer-readable medium having stored therein instructions which, when executed by one or more processors, cause the one or more processors to perform operations comprising:
identifying a network path having a plurality of hops, the plurality of hops comprising respective nodes, wherein the respective nodes are all configured in a forwarding mode;
traversing at least a portion of the network path to identify, for each node from the respective nodes, a respective next hop;
based on the respective next hop for each node, determining whether a network loop exists in the network path based on two or more nodes from the respective nodes have a same respective next hop, wherein the network loop would until broken indefinitely forward a packet repeatedly around the loop; and
breaking, in response to the determining, the network loop.

18. The medium of claim 17, wherein the respective nodes comprise ports set in forwarding mode, wherein each of the ports is associated with a respective switch.

19. The medium of claim 18, wherein the network comprises a virtual local area network, wherein determining that the network path has the network loop comprises determining that the virtual local area network has the network loop.

20. The medium of claim 19, the operations further comprising:
identifying a respective network path for each of a plurality of virtual local area networks in the network, the respective network path comprising a respective plurality of hops, the respective plurality of hops being comprising a respective plurality of nodes, the respective plurality of nodes being configured in the forwarding mode;
traversing each respective network path to identify, for each respective node in the respective plurality of nodes, a second respective next hop;
based on the second respective next hop for each respective node, determining whether two or more nodes from the respective plurality of nodes have a particular next hop in common; and
when the two or more nodes have the particular next hop in common, determining that the respective virtual local area network has a respective network loop.

* * * * *